US012163631B1

(12) United States Patent
Sadwick

(10) Patent No.: US 12,163,631 B1
(45) Date of Patent: Dec. 10, 2024

(54) SOLID STATE LIGHTING DRIVER AND LAMP REPLACEMENT FOR AVIONICS BALLAST AND FLUORESCENT LAMP

(71) Applicant: Laurence P. Sadwick, Salt Lake City, UT (US)

(72) Inventor: Laurence P. Sadwick, Salt Lake City, UT (US)

( * ) Notice: Subject to any disclaimer, the term of this patent is extended or adjusted under 35 U.S.C. 154(b) by 0 days.

(21) Appl. No.: 18/208,872

(22) Filed: Jun. 12, 2023

Related U.S. Application Data

(60) Provisional application No. 63/351,431, filed on Jun. 12, 2022.

(51) Int. Cl.
*F21K 9/275* (2016.01)
*F21K 9/278* (2016.01)
*F21Y 115/10* (2016.01)

(52) U.S. Cl.
CPC .............. *F21K 9/275* (2016.08); *F21K 9/278* (2016.08); *F21Y 2115/10* (2016.08)

(58) Field of Classification Search
CPC ....... F21K 9/275; F21K 9/278; F21Y 2115/10
See application file for complete search history.

(56) References Cited

U.S. PATENT DOCUMENTS

2017/0310157 A1* 10/2017 Cannon ................. H02J 7/0013
2019/0385493 A1* 12/2019 Lei .......................... G09F 13/22
2020/0217496 A1* 7/2020 Dir .......................... F21L 4/025

* cited by examiner

*Primary Examiner* — Kevin Quarterman

(57) ABSTRACT

A solid-state light replacement includes a housing, a pair of electrical connections on the housing, a substrate within the housing and dividing the housing into at least two sections, at least one solid state light mounted to the substrate in one of the at least two sections and electrically connected to the pair of electrical connections, and at least one solid state installation error indicator light mounted to the substrate in another of the at least sections and electrically connected to the pair of electrical connections in an opposite polarity from the connection of the at least one solid state light to the pair of electrical connections.

14 Claims, 12 Drawing Sheets

SOLID STATE LIGHTING DRIVER AND LAMP REPLACEMENT FOR AVIONICS BALLAST AND FLUORESCENT LAMP

BACKGROUND

Fluorescent lamps are widely used in a variety of applications, such as for general purpose lighting in commercial and residential locations, in backlights for liquid crystal displays in computers and televisions, etc. Conventional fluorescent tubes used for general lighting cannot, in general, be directly plugged into alternating current (AC) voltage lines, but require a ballast that generates a higher voltage output to power the fluorescent lamp tubes. Fluorescent lamps generally include a glass tube, circle, spiral or other shaped bulb containing a gas at low pressure, such as argon, xenon, neon, or krypton, along with low pressure mercury vapor. A fluorescent coating is deposited on the inside of the lamp. As an electrical current is passed through the lamp, mercury atoms are excited and photons are released, most having frequencies in the ultraviolet spectrum. These photons are absorbed by the fluorescent coating, causing it to emit light at visible frequencies.

Fluorescent lamps and ballasts have limited life expectancies, and flickering fluorescent light is a familiar problem to most users of fluorescent lighting. When ballasts and starters require replacement, it can be difficult or challenging and even potentially dangerous for individuals and/or personnel who are not experienced or familiar with electrical matters including removal and installation of ballasts. Even replacing glass fluorescent tubes can be challenging and potentially dangerous, especially when pins at the ends of the tubes become stuck in low-cost plastic tombstone fixtures and force is required to remove the glass tube.

Solid-state lighting such as light emitting diodes provide a more efficient lighting solution than fluorescent lamps, and can operate using generally safer and lower voltage DC power supplies. They are generally longer lasting and control of color and color temperature is continually improving. However, replacement of fluorescent lamp fixtures or of ballasts and starters in fluorescent lamp fixtures is not always something that can be performed by end-users of the lighting. This is particularly true for fluorescent lamp fixtures installed in unique and highly customized locations, such as avionics platforms such as aircraft. Such environments may also have very limited time available for maintenance including replacing of fluorescent lamp tubes or retrofitting of solid-state lighting in place of fluorescent lamp fixtures.

BRIEF DESCRIPTION OF THE DRAWINGS

A further understanding of the various exemplary embodiments may be realized by reference to the figures which are described in remaining portions of the specification. In the figures, like reference numerals may be used throughout several drawings to refer to similar components.

DESCRIPTION

Figure 1:
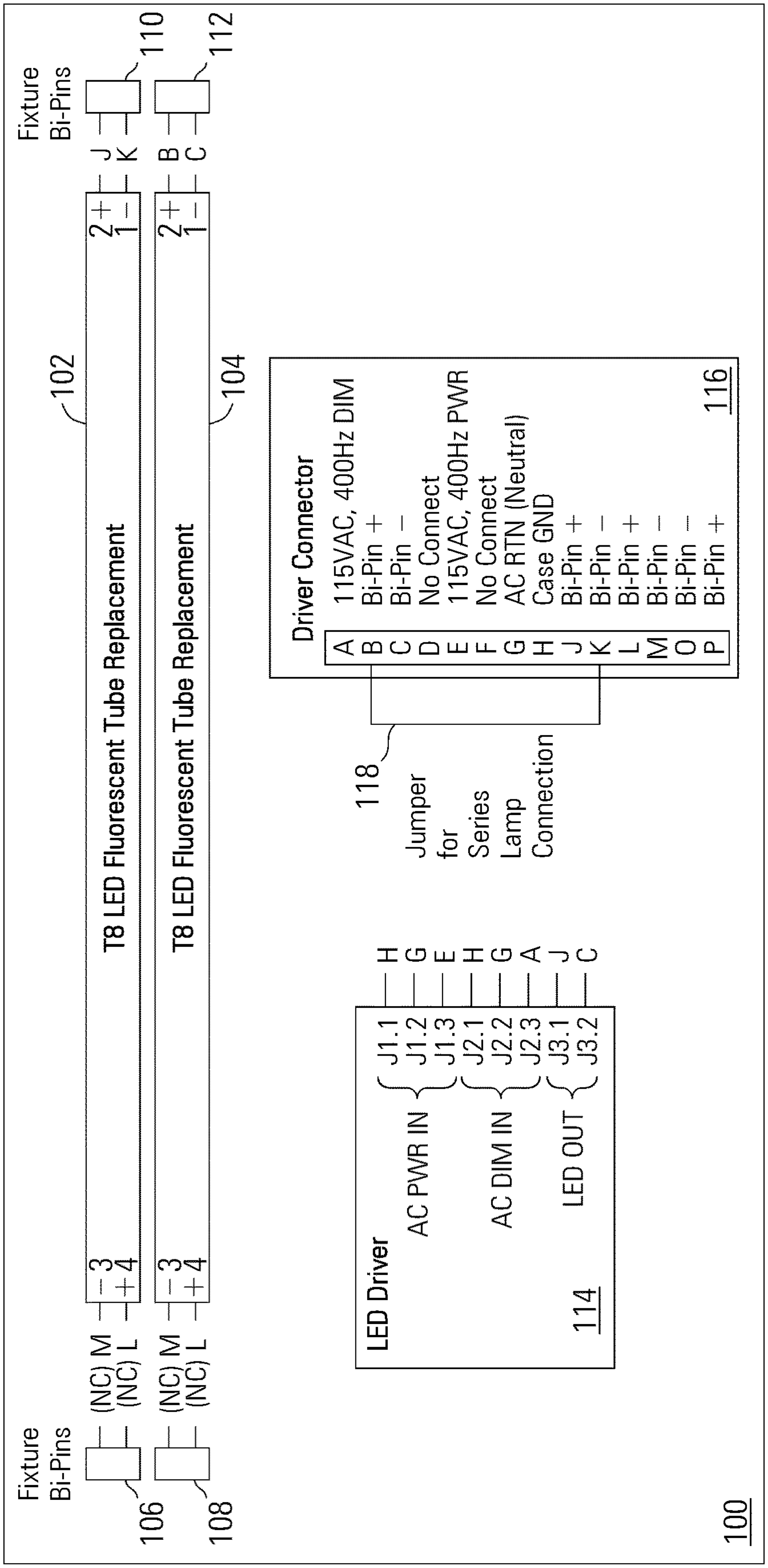
FIG. 1 depicts an example embodiment of a solid-state lighting driver and fluorescent lamp replacements. A fluorescent lamp fixture is depicted with a pair of installed LED lamps connected in series to a solid-state lighting driver in accordance with some embodiments of the invention. In this embodiment, the LED lamps are physically mounted to the fixture by tombstone connectors, but electrically connected to the driver only through a tombstone connector at one end of each tube.

The present invention includes a solid-state lighting driver and lamp replacement that can receive power from an AC line voltage or by a DC source to power one or more solid state lighting devices. In some embodiments, the driver provides a DC current which can be set to a constant level to power the lighting devices, or which can be reduced to dim the illumination from the lighting devices. The driver can be controlled/dimmed by, for example, but not limited to, an AC voltage, the amplitude of which controls the dimming level.

Although the driver can be configured to receive an AC line voltage at 50 Hz and/or 60 Hz, in some embodiments, the driver is adapted for an avionics application, to replace a ballast and fluorescent lamp. In some such non-limiting embodiments, AC line voltage is provided in or to the fixture substantially at a nominal 115 VAC, 400 Hz, although the driver and lamp replacement disclosed herein is not limited to any particular input AC voltage or frequency, and may be adapted to a DC input. The driver and lamp replacement can be adapted to AC input voltages at higher or lower voltages and/or frequencies. The driver and lamp replacement can further be adapted to use with an existing fluorescent ballast, receiving power from and through the ballast, or can be adapted for use in a fluorescent fixture from which the ballast has been removed.

As will be discussed in more detail below, the fluorescent lamp replacement can be embodied as a solid state lighting assembly that substantially matches the fluorescent lamp being replaced, and can be in any number of standard form factors including but not limited to T8, T10, T12, T5, T4, PL 2 pin and 4 pin, A lamp (E26 base), PAR 30, PAR 38, BR30, BR 40, R20, R30, R40, 2×2 ft panels, 2×4 ft panels, etc. in any white color temperature or color temperatures, etc. color including but not limited to RGB, RGBA, RRGBA, with or without other colors as discussed herein, UV including but not limited to UVA, UVB and UVC, IR as well as custom form factors.

In other embodiments, the lamp replacement can have a form factor that differs from the replaced fluorescent lamp, either being adapted to connect to existing tombstone or other connectors in the fluorescent fixture, or being adapted to connect to replacement electrical connectors in the fixture. The lamp replacement can be mounted to and held in place in the fixture by existing tombstone connectors, or can be attached in the fluorescent fixture in any other suitable manner.

As will be discussed in more detail below, in some embodiments of the present invention, the lamp replacement is adapted to minimize difficulty and errors during installation in a fluorescent fixture. In some such embodiments, the lamp replacement comprises a tube containing one or more solid state lights within, such as, but not limited to, one or more arrays of light emitting diodes (LEDs). Such a lamp replacement tube can be in a standard fluorescent lamp form factor as mentioned above, with one or more connection pins at both ends of the tube to connect to tombstone connectors in the lamp fixture. In some such embodiments, the replacement tube has a pair of bi-pin electrical connectors at each end of the tube. The lamp replacement in some of these embodiments is adapted to operate correctly regardless of how the tube is connected to the fixture, and swapping the tube end for end to reverse the connection of the tube will not change the proper flow and polarity of electrical power from the fixture to the tube. In some embodiments, the lamp replacement is adapted to function either normally with full dimmable illumination or to provide a visual indication of incorrect installation such as, but not limited to, one or more red lights, when during installation the tube is rotated within the fixture, so that the bi-pins connection to the pair of electrical conductors within the tombstone connector is reversed or swapped.

Turning now to FIG. 1 an example embodiment of a solid-state lighting driver 114 and solid-state fluorescent lamp replacements 102, 104 is depicted. A fluorescent lamp fixture 100 is depicted with a pair of installed LED lamps 102, 104 connected in series to a solid-state lighting driver 114 in accordance with some embodiments of the invention. In this embodiment, the LED lamps 102, 104 are physically mounted to the fixture 100 by tombstone connectors 106, 108, 110, 112, but electrically connected to the driver 114 only through a tombstone connector 110, 112 at one end of each tube 102, 104.

Each tube 102, 104 may comprise a housing such as, but not limited to, a hollow cylindrical housing made of plastic, acrylic, glass, or any other suitable material.

Although the fluorescent fixture 100 is depicted with four tombstone connectors 106, 108, 110, 112 to physically support and electrically connect two tubes 102, 104, and the two tubes 102, 104 are powered by a single solid-state lighting driver 114, the fluorescent fixture 100 can include more tombstone connectors to hold more lamp tubes, and more drivers 114 can be used as desired to provide suitable power to lamp replacements 102, 104, to provide independent control to lamp replacements or banks of lamp replacements, or for any other purpose. Any practical number of lamps and drivers can be used with embodiments of the present invention which are examples of the present invention and not limited to.

In the example embodiment depicted in FIG. 1, a driver connector 116 is provided to electrically connect the driver 114 to the fixture 100. The specific signals/conductors provided in the connector 116 should be seen as non-limiting examples, which can be adapted as desired based on the fixture 100 and the configuration of the driver 114. In this example embodiments, signals B, J, L and P are connected to positive wires in tombstone connectors 106, 108, 110, 112, and signals C, K, M and O are connected to negative wires in the tombstone connectors 106, 108, 110, 112. During installation of the driver 114 and lamp replacements 102, 104, the fixture wiring to the tombstone connectors 106,

108, 110, 112 can be modified as needed depending on factors such as whether the lamp replacements 102, 104 are to be connected in series or parallel, electrically connected at just one end or both, etc.

Continuing with the signals/conductors in the example connector 116, a power signal E/neutral signal G obtains power from the fixture. In some example embodiments, such as an avionics application, the power on signal E may be on the order of a nominal 115 VAC, 400 Hz, although this should be seen as a non-limiting example, and the driver and lamp replacements disclosed herein are not limited to any particular AC voltage or frequency, or even to AC power.

A dimming signal A relative to G is provided in some embodiments, and can be, but is not limited to, an example nominal 115 VAC, 400 Hz dimming signal, where an amplitude of the voltage on the signal A as it is reduced from the nominal 115 VAC controls dimming of the driver 114 and resulting illumination levels/brightness from the lamp replacements 102, 104. Note, in some embodiments of the present invention, there may be a separate signal such as a separate neutral from the AC Power in and a separate neutral for the dimmer instead of a commonly shared neutral signal G.

An AC return or neutral signal G can be provided in connector 116, and a case ground signal H which can be electrically connected to the fixture 100 to reduce the likelihood of electrical shocks.

The driver 114 in the non-limiting example embodiment depicted in FIG. 1 has a three-pin or three-conductor power input (AC PWR IN), which is connected to the case ground H, the return G and the power E. The example driver 114 has a three-conductor dimming control input (AC DIM IN) which is connected to the case ground H, the return G and the dimming signal A. Again, dimming in the driver 114 can be controlled in some embodiments by the AC voltage level on dimming signal A, or can be controlled using any other suitable dimming control scheme currently known or that may be developed in the future, whether transmitted over one or more wires or wirelessly. The example driver 114 has a load output (LED OUT) which supplies electrical current to solid state lights in lamp replacements 102, 104, via any suitable desired pins or bi-pins on the lamp replacements 102, 104, through selected ones or all of the tombstone connectors 106, 108, 110, 112.

In the example configuration depicted in FIG. 1, the lamp replacements 102, 104 are connected in series, electrically connected to the driver connector 116, driver 110 and fixture 100 only through a pair of tombstone connectors 110, 112 at one end of each lamp replacement 102, 104. The driver 110 provides a positive, LEDP connection through signal J to tombstone connector 110, and a negative, LEDN connection through signal C to tombstone connector 112. An electrical jumper 118 is provided between signals K and B, either at the driver connector 116, at tombstone connectors 110, 112 or in any other suitable manner in the fixture 100 including, but not limited to, the cable.

Each lamp replacement 102, 104 in this non-limiting example embodiment as a pair of bi-pins at each end of the tube, including two positive conductors at pins 2 and 4 and two negative conductors at pins 1 and 3. In this example configuration depicted in FIG. 1, positive pin 2 on tube 102 is connected to signal J on driver connector 116 through tombstone 110, which is connected to LEDP from driver 114. Negative pin 1 on tube 102 is connected to signal K on driver connector 116 through tombstone 110, which is connected to signal B on driver connector 116 through jumper 118. Positive pin 2 on tube 104 is also connected to signal B through tombstone 112, and negative pin 1 on tube 104 is connected to signal C on driver connector 116 through tombstone 112, which is connected to LEDN from driver 114.

Positive pin 4 and negative pin 3 of tube 102, and positive pin 4 and negative pin 3 of tube 104 are physically connected to tombstones 106 and 108, but can be electrically connected to signals M and L of driver connector 116, but which are not electrically connected to driver 114 or the fixture 100. In some implementations of the present invention, signals M and L are not electrically connected to anything and are open and not connected.

During operation in this example embodiment and configuration, LED driver 100 receives AC power and dimming control through driver connector 116 from the fixture 100, and provides DC power suitable for solid state lighting in replacement tubes 102, 104 based on the dimming control signal. Power flows from LED driver 100 through signal J in driver connector 116 and tombstone 110, into positive pin 2 of replacement tube 102, out of negative pin 1 of replacement tube 102 to signal K in tombstone 110 and driver connector 116, through jumper 118 to signal B in driver connector 116 and tombstone 112, into positive pin 2 of replacement tube 104, out of negative pin 1 of replacement tube 104 to signal C in tombstone 112 and driver connector 116 and into the return line of LED driver 100.

Figure 2:
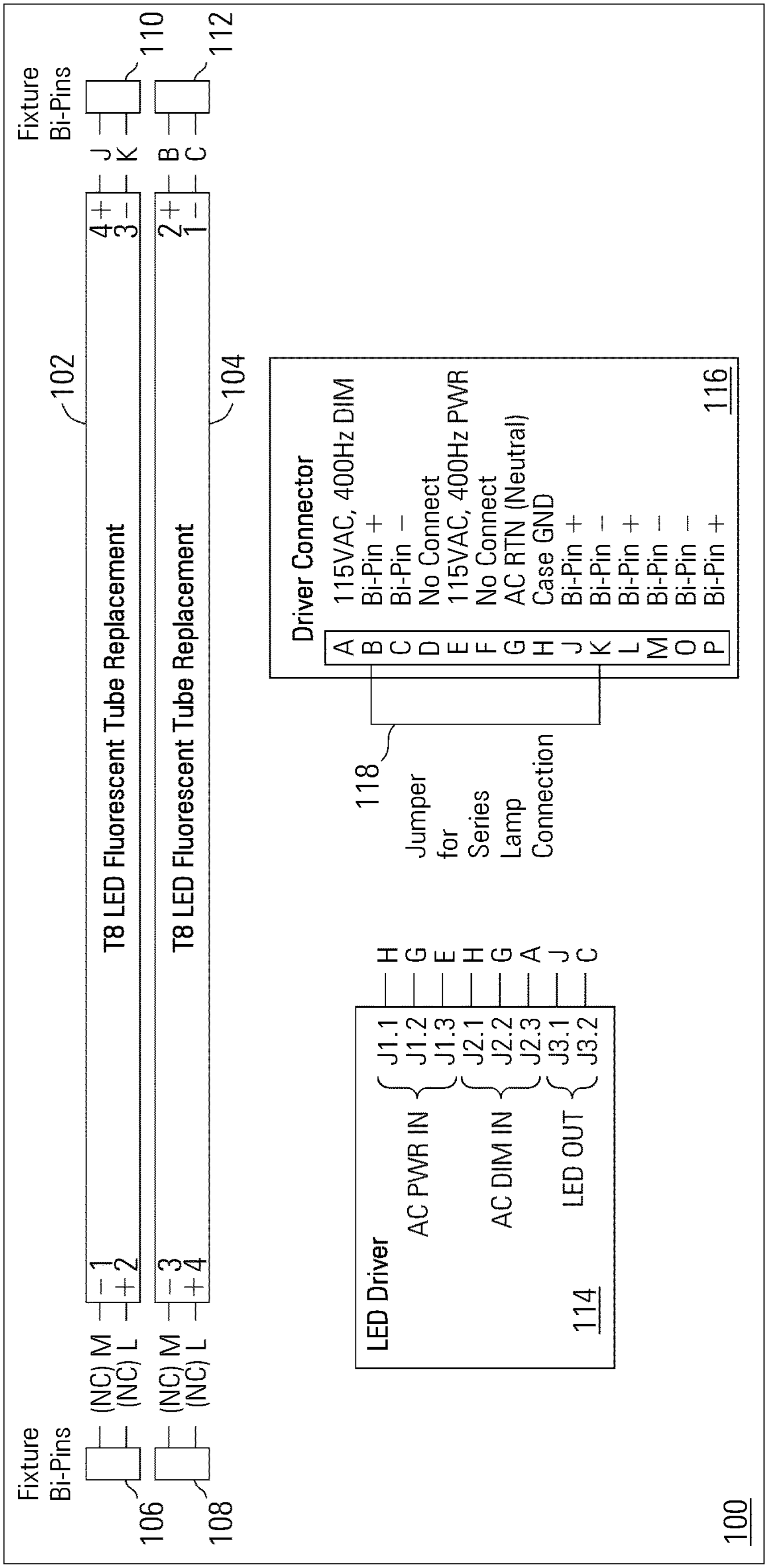
FIG. 2 depicts an example embodiment of a solid-state lighting driver and fluorescent lamp replacements. A fluorescent lamp fixture is depicted with a pair of installed LED lamps connected in series to a solid-state lighting driver in accordance with some embodiments of the invention. In this embodiment, the LED lamps are physically mounted to the fixture by tombstone connectors, but electrically connected to the driver only through a tombstone connector at one end of each tube. In this embodiment, one of the pair of LED lamps is swapped end for end, illustrating that it operates properly regardless of which end of the LED lamp is connected to which tombstone connector.

The driver 114 and replacement tubes 102, 104 are adapted in some embodiments to simplify installation and reduce or eliminate installation errors. Turning now to FIG. 2, the example embodiment of the solid-state lighting driver 114 and solid-state fluorescent lamp replacements 102, 104 is depicted in another configuration, with replacement tube 102 flipped end for end, so that pins 1 and 2 are connected to tombstone 106 and pins 3 and 4 are connected to tombstone 110. Because signals M and L in tombstone 106 are not connected to driver connector 116 or driver 114, replacement tube 102 draws power through pins 4 and 3 via tombstone 110 rather than through pins 1 and 2. However, the circuits in replacement tube 102 are configured to allow power to flow from positive to negative pin at either end, and in some example embodiments, can flow from a positive pin at one end to a negative pin at the other end.

During operation in the example configuration of FIG. 2, LED driver 100 receives AC power and dimming control through driver connector 116 from the fixture 100, and provides DC power suitable for solid state lighting in replacement tubes 102, 104 based on the dimming control signal. Power flows from LED driver 100 through signal J in driver connector 116 and tombstone 110, into positive pin 4 of replacement tube 102, out of negative pin 3 of replacement tube 102 to signal K in tombstone 110 and driver connector 116, through jumper 118 to signal B in driver connector 116 and tombstone 112, into positive pin 2 of replacement tube 104, out of negative pin 1 of replacement tube 104 to signal C in tombstone 112 and driver connector 116 and into the return line of LED driver 100.

Figure 3:
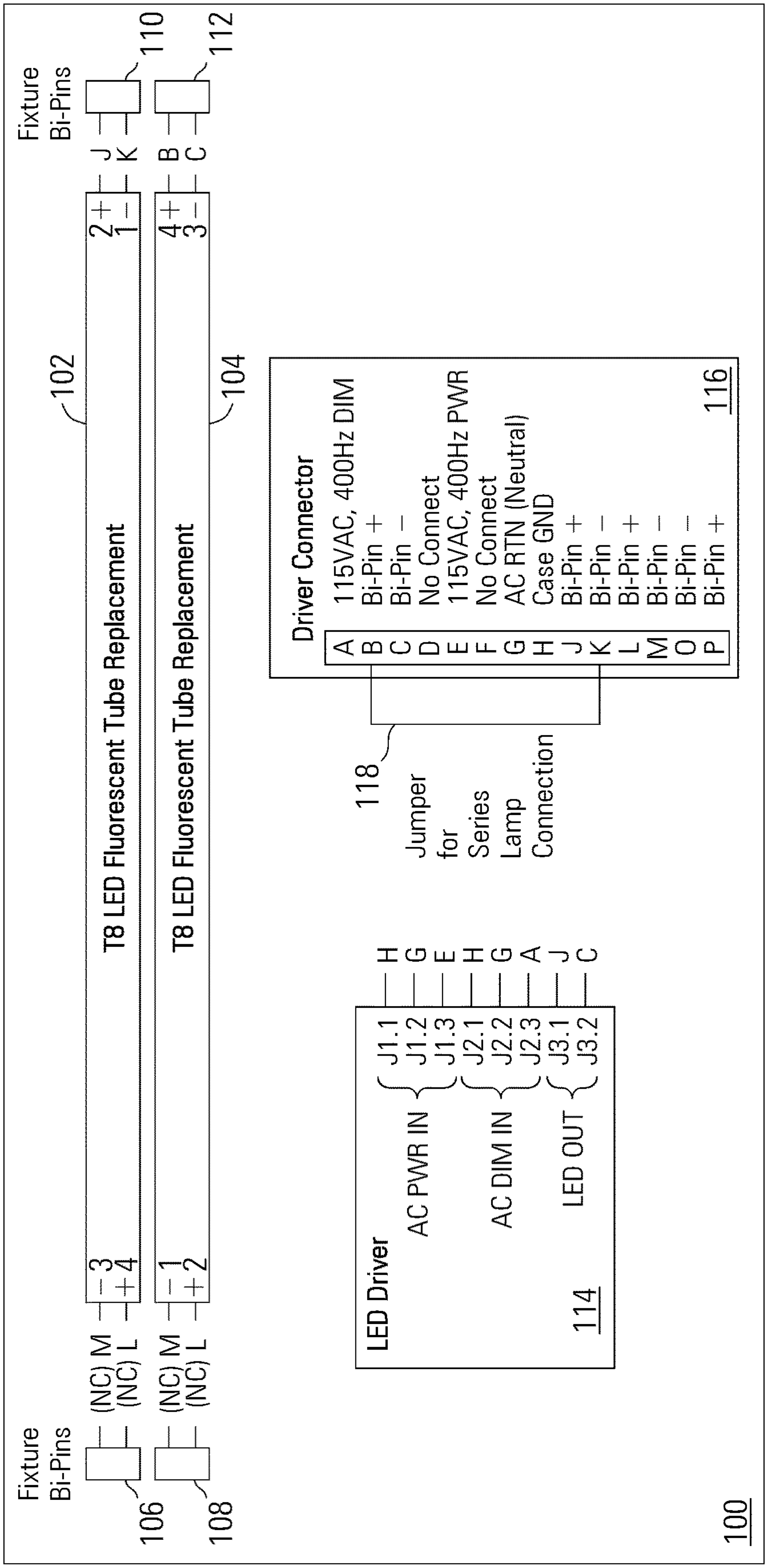
FIG. 3 depicts an example embodiment of a solid-state lighting driver and fluorescent lamp replacements. A fluorescent lamp fixture is depicted with a pair of installed LED lamps connected in series to a solid-state lighting driver in accordance with some embodiments of the invention. In this embodiment, the LED lamps are physically mounted to the fixture by tombstone connectors, but electrically connected to the driver only through a tombstone connector at one end of each tube. In this embodiment, a different one of the pair of LED lamps is swapped end for end, illustrating that it operates properly regardless of which end of the LED lamp is connected to which tombstone connector.

Turning now to FIG. 3, the example embodiment of the solid-state lighting driver 114 and solid-state fluorescent lamp replacements 102, 104 is depicted in another configuration, with replacement tube 104 flipped end for end, so that pins 1 and 2 are connected to tombstone 108 and pins 3 and 4 are connected to tombstone 112. Because signals M and L in tombstone 108 are not connected to driver connector 116 or driver 114, replacement tube 104 draws power through pins 4 and 3 via tombstone 112 rather than through pins 1 and 2. However, the circuits in replacement tube 104 are configured to allow power to flow from positive to negative pin at either end, and in some example embodiments, can flow from a positive pin at one end to a negative pin at the other end.

During operation in the example configuration of FIG. 3, LED driver 100 receives AC power and dimming control through driver connector 116 from the fixture 100, and provides DC power suitable for solid state lighting in replacement tubes 102, 104 based on the dimming control signal. Power flows from LED driver 100 through signal J in driver connector 116 and tombstone 110, into positive pin 2 of replacement tube 102, out of negative pin 1 of replacement tube 102 to signal K in tombstone 110 and driver connector 116, through jumper 118 to signal B in driver connector 116 and tombstone 112, into positive pin 4 of replacement tube 104, out of negative pin 3 of replacement tube 104 to signal C in tombstone 112 and driver connector 116 and into the return line of LED driver 100.

Figure 4:
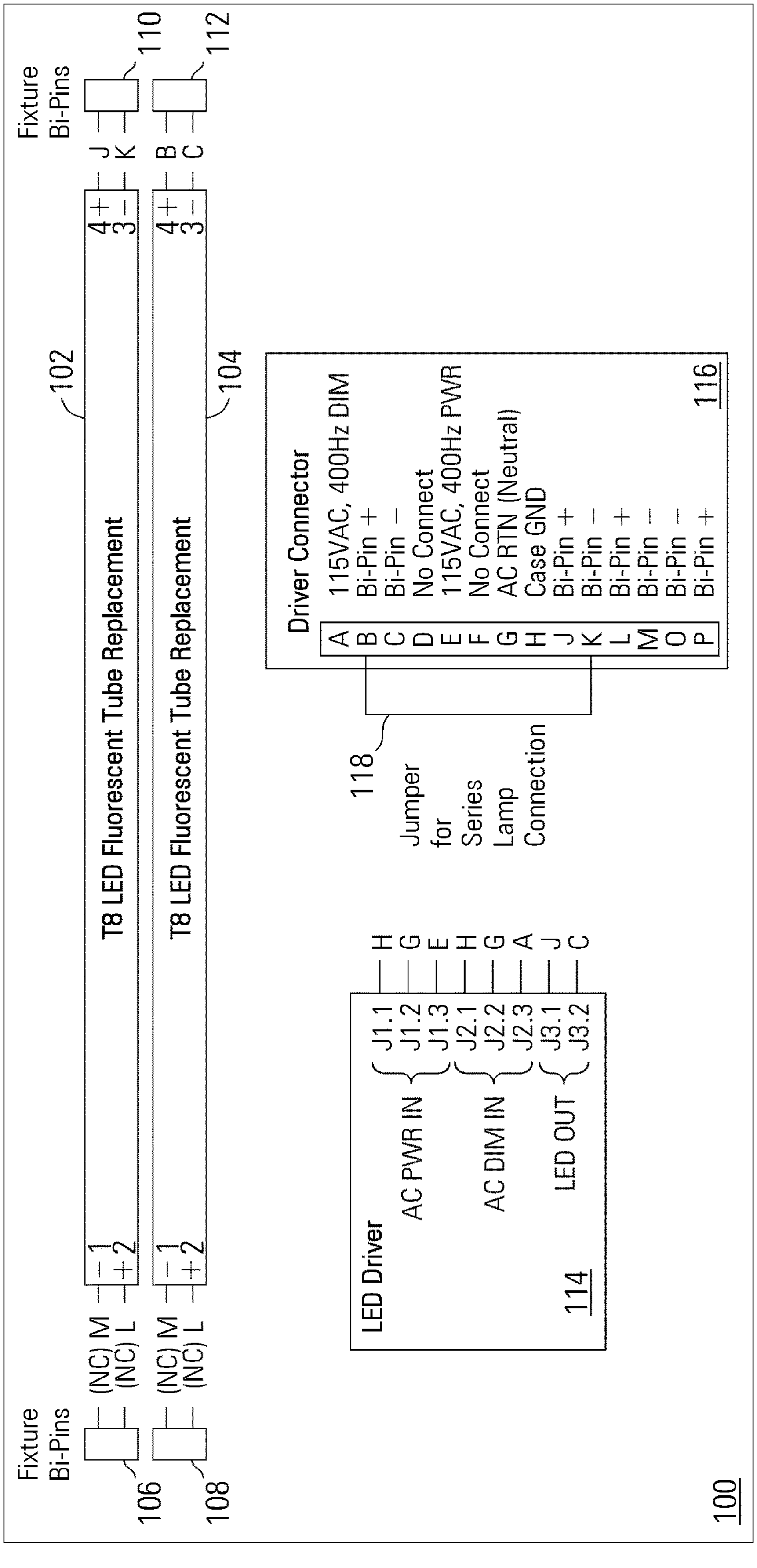
FIG. 4 depicts an example embodiment of a solid-state lighting driver and fluorescent lamp replacements. A fluorescent lamp fixture is depicted with a pair of installed LED lamps connected in series to a solid-state lighting driver in accordance with some embodiments of the invention. In this embodiment, the LED lamps are physically mounted to the fixture by tombstone connectors, but electrically connected to the driver only through a tombstone connector at one end of each tube. In this embodiment, both LED lamps are swapped end for end, illustrating that they operate properly regardless of which end of the LED lamp is connected to which tombstone connector.

As depicted in FIG. 4, the orientation is reversible in both replacement tubes 102 and 104, and both can be reversed or swapped as shown, so that pins 1 and 2 of replacement tube 102 are connected to tombstone 106, pins 3 and 4 of replacement tube 102 are connected to tombstone 110, pins 1 and 2 of replacement tube 104 are connected to tombstone 108, and pins 3 and 4 of replacement tube 104 are connected to tombstone 112. Because signals M and L in tombstones 106 and 108 are not connected to driver connector 116 or driver 114, replacement tubes 102, 104 draws power through their pins 4 and 3 via tombstones 110, 112 rather than through their pins 1 and 2. However, the circuits in replacement tubes 102, 104 are configured to allow power to flow from positive to negative pin at either end, and in some example embodiments, can flow from a positive pin at one end to a negative pin at the other end.

During operation in the example configuration of FIG. 4, LED driver 100 receives AC power and dimming control through driver connector 116 from the fixture 100, and provides DC power suitable for solid state lighting in replacement tubes 102, 104 based on the dimming control signal. Power flows from LED driver 100 through signal J in driver connector 116 and tombstone 110, into positive pin 4 of replacement tube 102, out of negative pin 3 of replacement tube 102 to signal K in tombstone 110 and driver connector 116, through jumper 118 to signal B in driver connector 116 and tombstone 112, into positive pin 4 of replacement tube 104, out of negative pin 3 of replacement tube 104 to signal C in tombstone 112 and driver connector 116 and into the return line of LED driver 100.

Figure 5:
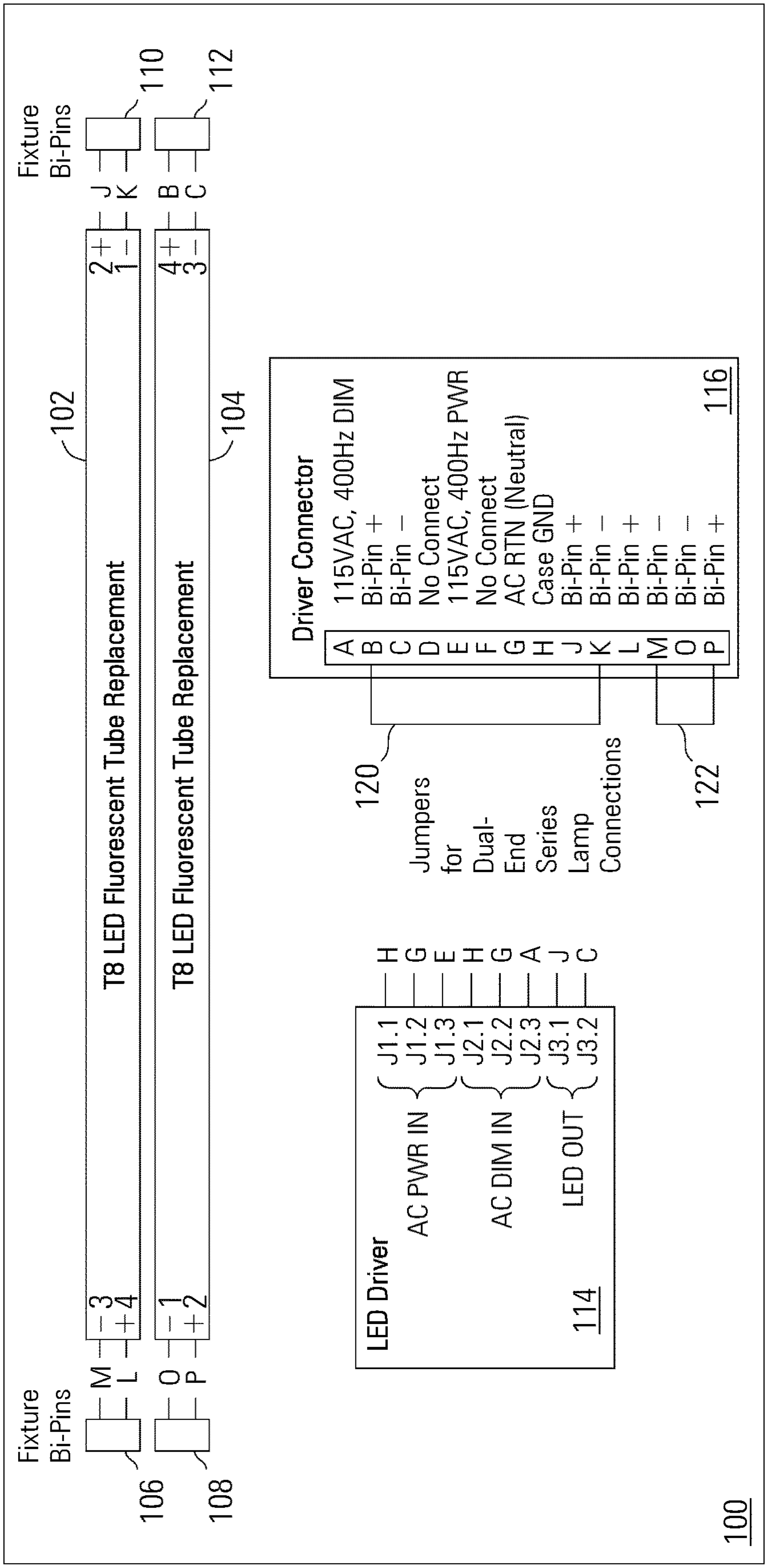
FIG. 5 depicts an example embodiment of a solid-state lighting driver and fluorescent lamp replacements. A fluorescent lamp fixture is depicted with a pair of installed LED lamps connected in series to a solid-state lighting driver in accordance with some embodiments of the invention. In this embodiment, the LED lamps are physically mounted to the fixture by tombstone connectors, and electrically connected in series to the driver through tombstone connectors at both ends of each tube.

Turning now to FIG. 5, the example embodiment of the solid-state lighting driver 114 and solid-state fluorescent lamp replacements 102, 104 is depicted in another configuration, with replacement tubes 102, 104 connected in series and connected to driver 114 through driver connector 116 by tombstones 106, 108, 110, 112 at both ends of each replacement tube 102, 104. This provides redundancy and error tolerance, allowing power to flow through replacement tubes 102, 104 even in the event of a wiring disconnected in a tombstone connector. Again, the circuits in replacement tubes 102, 104 are configured to allow power to flow from positive to negative pin at either end, as well as from a positive pin at one end to a negative pin at the other end.

Embodiments of FIG. 5 may result in the lamps 102, 104 becoming parallelly connected unless the socket bi-pins M L and O P, respectively, are not connected electrically (i.e., NC which stands for No Connection) as in FIG. 4.

During operation in the example configuration of FIG. 5, LED driver 100 receives AC power and dimming control through driver connector 116 from the fixture 100, and provides DC power suitable for solid state lighting in replacement tubes 102, 104 based on the dimming control signal. Power flows from LED driver 100 through signal J in driver connector 116 and tombstone 110, into positive pin 2 of replacement tube 102, out of negative pin 1 of replacement tube 102 to signal K in tombstone 110 and driver connector 116, through jumper 120 to signal B in driver connector 116 and tombstone 112, into positive pin 4 of replacement tube 104, out of negative pin 3 of replacement tube 104 to signal C in tombstone 112 and driver connector 116 and into the return line of LED driver 100. An alternative or parallel current path is also present from LED driver 100 through signal L in driver connector 116 and tombstone 106, into positive pin 4 of replacement tube 102, out of negative pin 3 of replacement tube 102 to signal M in tombstone 106 and driver connector 116, through jumper 122 to signal P in driver connector 116 and tombstone 108, into positive pin 2 of replacement tube 104, out of negative pin 1 of replacement tube 104 to signal O in tombstone 108 and driver connector 116 and into the return line of LED driver 100. As noted above, current can also flow from end to end in each replacement tube 102, 104 from a positive pin at one end to a negative pin at the other end. The configuration of FIG. 5 is thus a stacked 'H' current path, with two series current paths in parallel with two cross-paths through replacement tubes 102, 104. This helps prevent a single point of failure in the wiring. Again, in some implementations of embodiments of the present, signal pins M and L (and O and P when separated from M and L) are not electrically connected.

Figure 6:
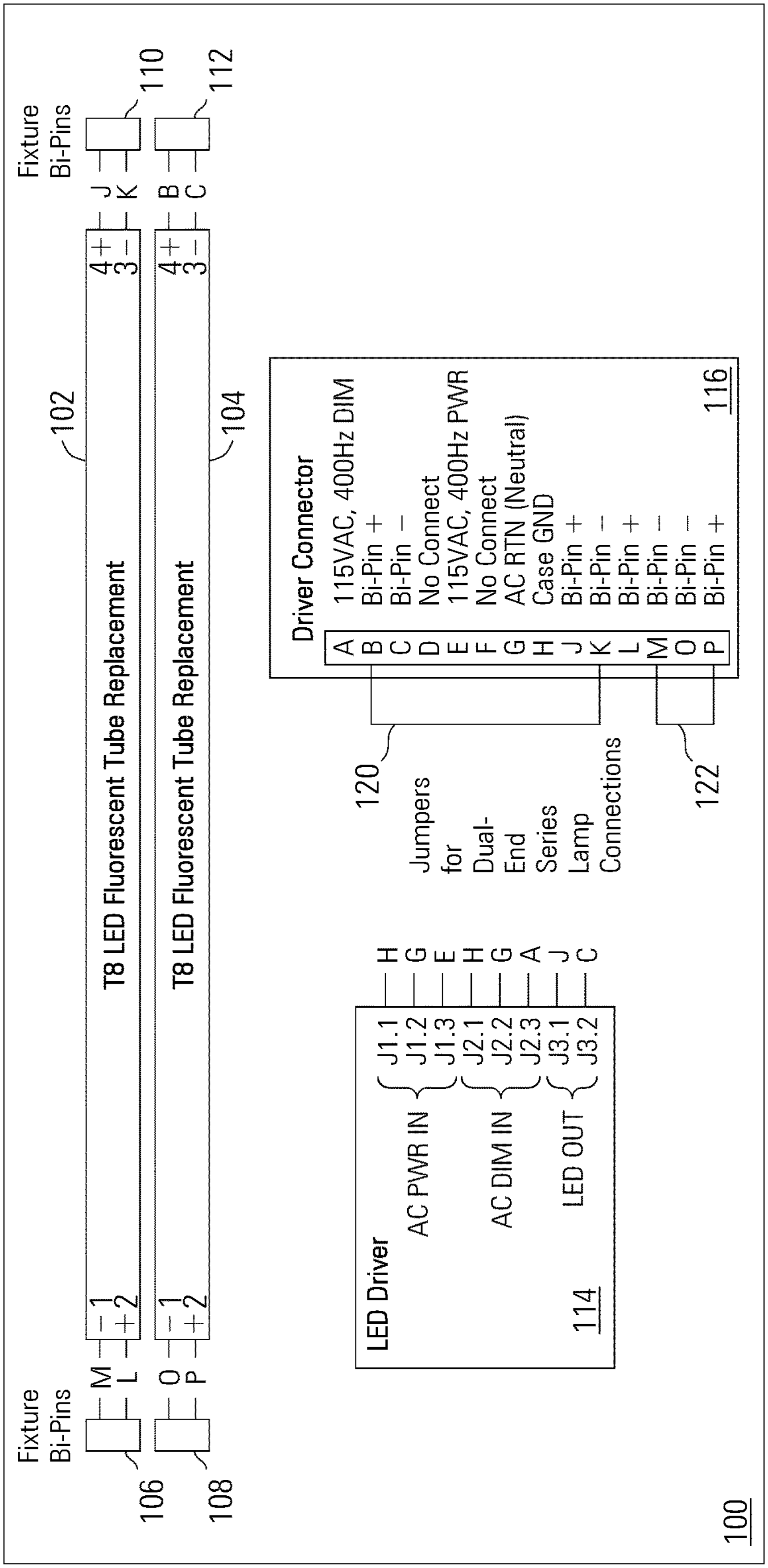
FIG. 6 depicts an example embodiment of a solid-state lighting driver and fluorescent lamp replacements. A fluorescent lamp fixture is depicted with a pair of installed LED lamps connected in series to a solid-state lighting driver in accordance with some embodiments of the invention. In this embodiment, the LED lamps are physically mounted to the fixture by tombstone connectors, and electrically connected in series to the driver through tombstone connectors at both ends of each tube. In this embodiment, one of the pair of LED lamps is swapped end for end, illustrating that it operates properly regardless of which end of the LED lamp is connected to which tombstone connector.

Even in the dual-series path configuration, each or both of replacement tubes 102, 104 can be flipped end for end between tombstones 106, 108, 110, 112 without impeding current flow or operation. Turning now to FIG. 6, the example embodiment of the solid-state lighting driver 114 and solid-state fluorescent lamp replacements 102, 104 is depicted with replacement tubes 102, 104 connected in series and connected to driver 114 through driver connector 116 by tombstones 106, 108, 110, 112 at both ends of each replacement tube 102, 104, but with replacement tube 102 flipped end for end. Again, the circuits in replacement tubes 102, 104 are configured to allow power to flow from positive to negative pin at either end, as well as from a positive pin at one end to a negative pin at the other end.

Embodiments of FIG. 6 may result in the lamps becoming parallelly connected unless the socket bi-pins M L and O P, respectively, are not connected electrically (i.e., NC which stands for No Connection) as in FIG. 4.

During operation in the example configuration of FIG. 6, LED driver 100 receives AC power and dimming control through driver connector 116 from the fixture 100, and provides DC power suitable for solid state lighting in replacement tubes 102, 104 based on the dimming control signal. Power flows from LED driver 100 through signal J in driver connector 116 and tombstone 110, into positive pin 4 of replacement tube 102, out of negative pin 3 of replacement tube 102 to signal K in tombstone 110 and driver connector 116, through jumper 120 to signal B in driver connector 116 and tombstone 112, into positive pin 4 of replacement tube 104, out of negative pin 3 of replacement tube 104 to signal C in tombstone 112 and driver connector 116 and into the return line of LED driver 100. An alternative or parallel current path is also present from LED driver 100 through signal L in driver connector 116 and tombstone 106, into positive pin 2 of replacement tube 102, out of negative pin 1 of replacement tube 102 to signal M in tombstone 106 and driver connector 116, through jumper

122 to signal P in driver connector 116 and tombstone 108, into positive pin 2 of replacement tube 104, out of negative pin 1 of replacement tube 104 to signal O in tombstone 108 and driver connector 116 and into the return line of LED driver 100. As noted above, current can also flow from end to end in each replacement tube 102, 104 from a positive pin at one end to a negative pin at the other end. The configuration of FIG. 6 is thus a stacked 'H' current path, with two series current paths in parallel with two cross-paths through replacement tubes 102, 104. This helps prevent a single point of failure in the wiring.

Figure 7:
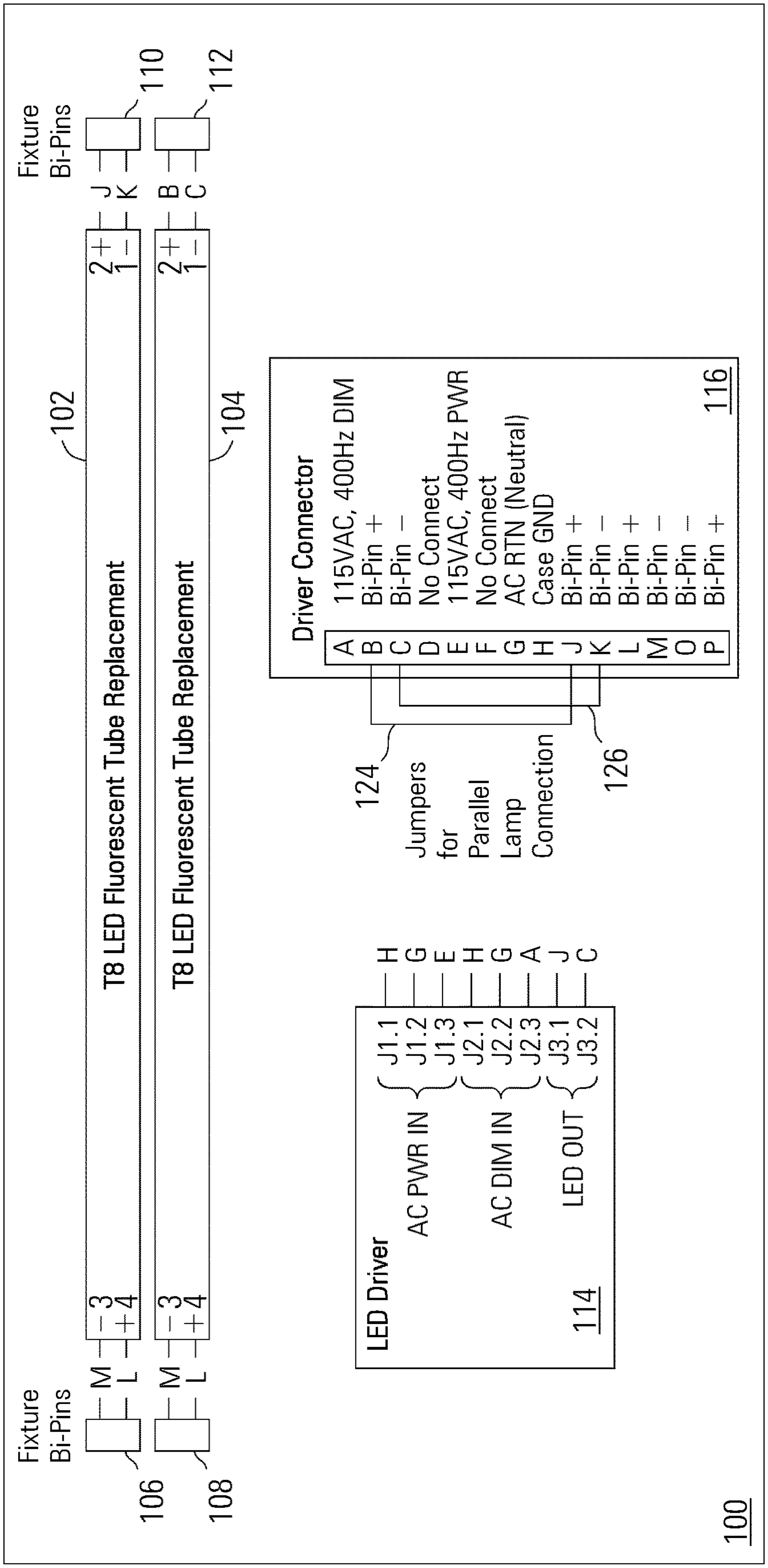
FIG. 7 depicts an example embodiment of a solid-state lighting driver and fluorescent lamp replacements. A fluorescent lamp fixture is depicted with a pair of installed LED lamps connected in parallel to a solid-state lighting driver in accordance with some embodiments of the invention. In this embodiment, the LED lamps are physically mounted to the fixture by tombstone connectors, but electrically connected to the driver only through a tombstone connector at one end of each tube.

Turning now to FIG. 7 an example embodiment of a solid-state lighting driver 114 and solid-state fluorescent lamp replacements 102, 104 is depicted. A fluorescent lamp fixture 100 is depicted with a pair of installed LED lamps 102, 104 connected in series to a solid-state lighting driver 114 in accordance with some embodiments of the invention. In this embodiment, the LED lamps 102, 104 are physically mounted to the fixture 100 by tombstone connectors 106, 108, 110, 112, but electrically connected to the driver 114 only through a tombstone connector 110, 112 at one end of each tube 102, 104.

In the example configuration depicted in FIG. 7, the lamp replacements 102, 104 are connected in parallel, electrically connected to the driver connector 116, driver 110 and fixture 100 only through a pair of tombstone connectors 110, 112 at one end of each lamp replacement 102, 104. The driver 110 provides a positive, LEDP connection through signal J to tombstone connector 110 and to signal B through tombstone 112 through jumper 124, and a negative, LEDN connection through signal K to tombstone 110 and to signal C to tombstone connector 112 through jumper 126.

During operation in this example embodiment and configuration, power flows from LED driver 100 through signal J in driver connector 116 and tombstone 110, into positive pin 2 of replacement tube 102, out of negative pin 1 of replacement tube 102 to signal K in tombstone 110 and driver connector 116 and into the return line of LED driver 100, and in parallel via jumpers 124 and 126, from LED driver 100 through signal B in driver connector 116 and tombstone 110, into positive pin 2 of replacement tube 104, out of negative pin 1 of replacement tube 102 to signal C in tombstone 112 and driver connector 116 and into the return line of LED driver 100.

Figure 8:
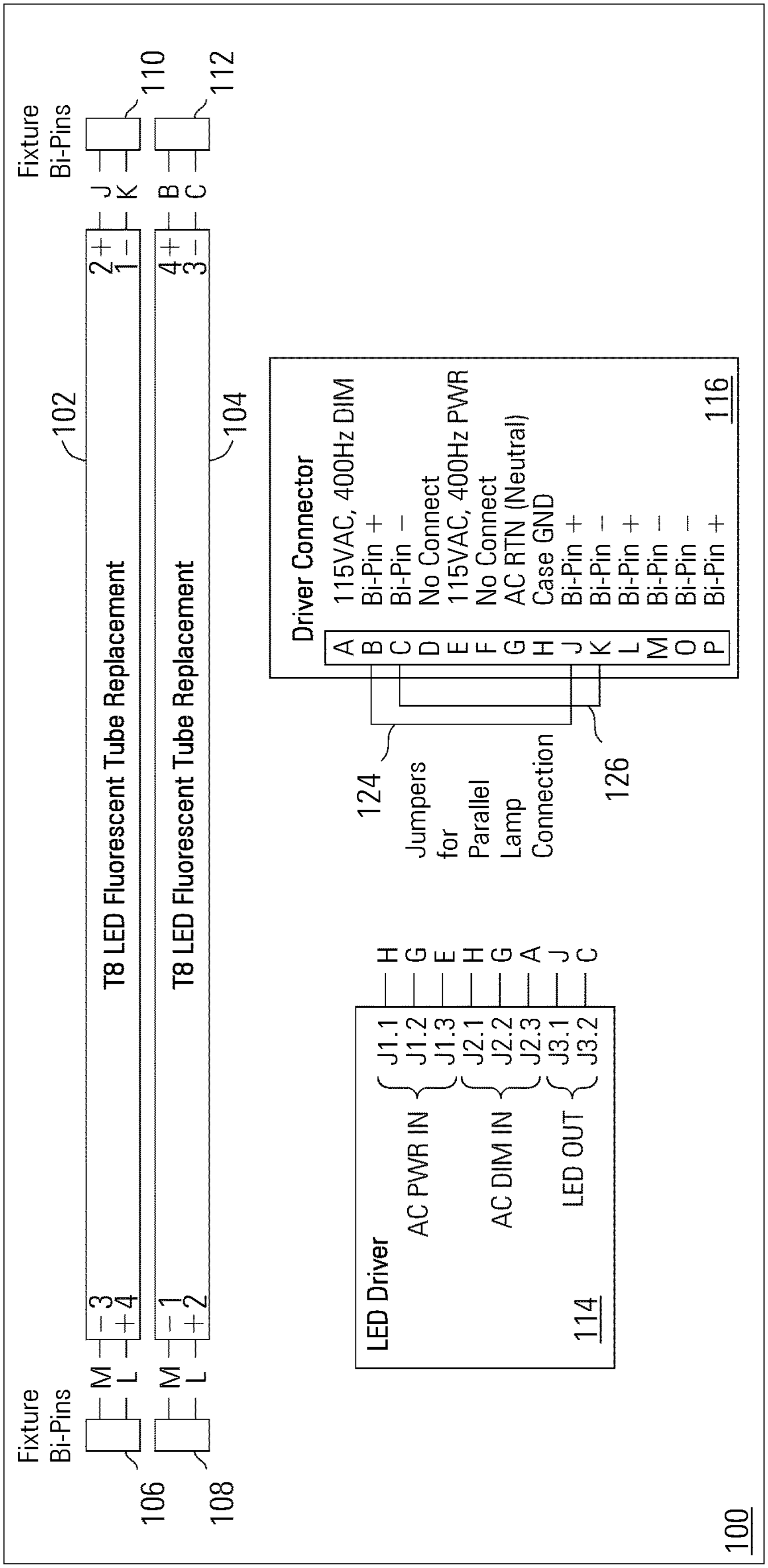
FIG. 8 depicts an example embodiment of a solid-state lighting driver and fluorescent lamp replacements. A fluorescent lamp fixture is depicted with a pair of installed LED lamps connected in parallel to a solid-state lighting driver in accordance with some embodiments of the invention. In this embodiment, the LED lamps are physically mounted to the fixture by tombstone connectors, but electrically connected to the driver only through a tombstone connector at one end of each tube. In this embodiment, one of the pair of LED lamps is swapped end for end, illustrating that it operates properly regardless of which end of the LED lamp is connected to which tombstone connector.

As with the series configurations depicted in FIGS. 1-4, either or both replacement tubes 102, 104 can be flipped end for end without impeding current flow or operation. As depicted in FIG. 8, the example embodiment of the solid-state lighting driver 114 and solid-state fluorescent lamp replacements 102, 104 is depicted in another configuration, with replacement tube 104 flipped end for end, so that pins 1 and 2 are connected to tombstone 108 and pins 3 and 4 are connected to tombstone 112. In any of these parallel and/or series lamp configurations, the Fixture Bi-Pins 106 and 108 are not necessarily needed for the lamps to operate properly with only Fixture Bi-Pins 110 and 112 needed. Of course, the opposite is also true in that Fixture Bi-Pins 110 and 112 could be not electrically connected and, instead, Fixture Bi-Pins 106 and 108 could be electrically connected. In some embodiments only one set of Fixture Bi-Pins on each side of Fixture 100 (e.g. 106) are electrically active with the other set of diagonally opposed Fixture Bi-Pins on the other side being electrically connected (e.g. 112) and with Fixture Bi-Pins 108 and 110 not connected to the Driver 114 and effectively electrically inactive.

During operation in the non-limiting example configuration of FIG. 8, power flows from LED driver 100 through signal J in driver connector 116 and tombstone 110, into positive pin 2 of replacement tube 102, out of negative pin 1 of replacement tube 102 to signal K in tombstone 110 and driver connector 116 and into the return line of LED driver 100, and in parallel via jumpers 124 and 126, from LED driver 100 through signal B in driver connector 116 and tombstone 110, into positive pin 4 of replacement tube 104, out of negative pin 3 of replacement tube 102 to signal C in tombstone 112 and driver connector 116 and into the return line of LED driver 100.

As with the series connection embodiment depicted in FIGS. 5-6, some parallel connection embodiments can provide connections at each end of replacement tubes 102, 104 in order to avoid a single point of failure, although multiple parallel current paths can result in a change in overall impedance if one current path is broken due to faults, or imbalanced current flow through parallel paths. Such imbalances or changes in impedance can be actively or passively corrected if desired including, but not limited to, for example, by additional circuit elements.

Figure 9A:
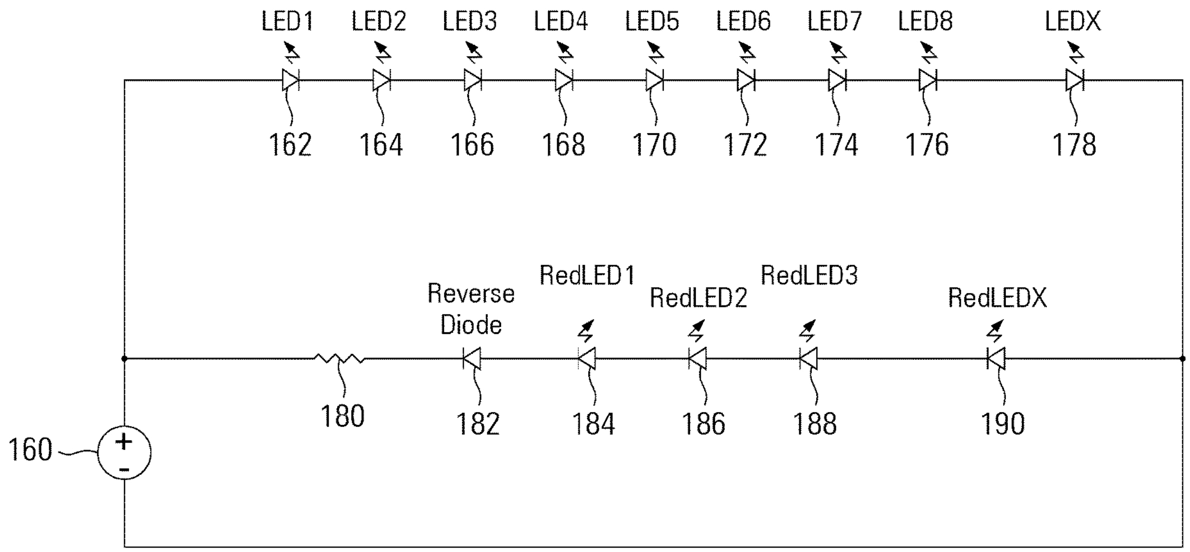
FIGS. 9A-9B depict an example embodiment of an incorrect installation circuit in a solid-state lamp replacement.
Figure 9B:
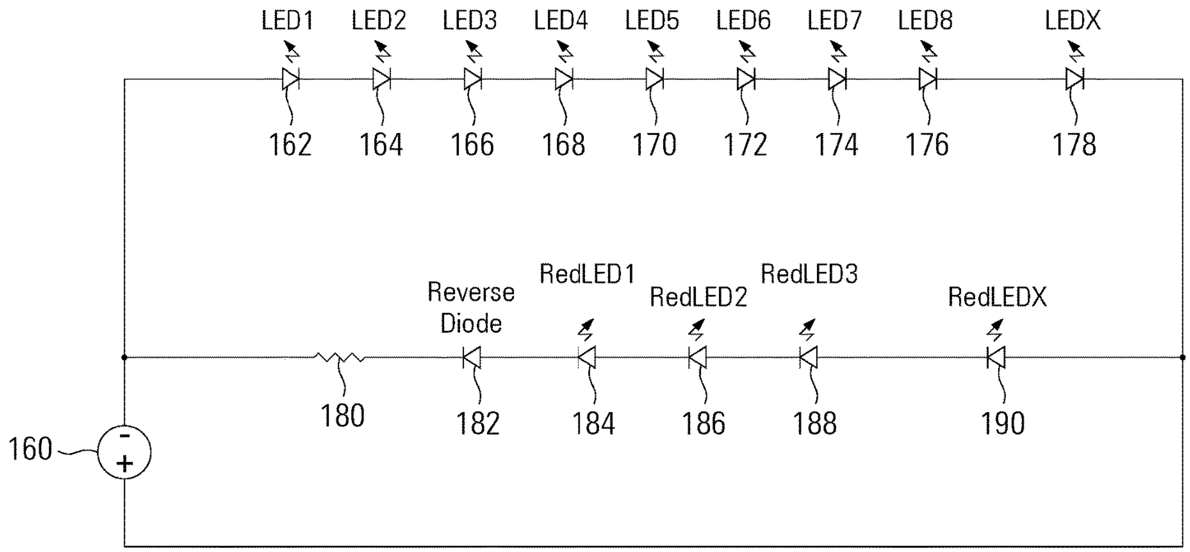
Figure 10:
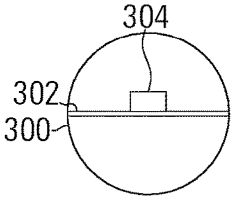
FIGS. 10-24 depict example embodiments replacement tubes in cross-section, end-on views, showing various arrangements of LEDs and incorrect installation indicator LEDs within the replacement tube.
Figure 11:
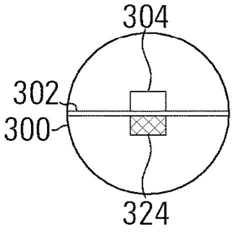
Figure 12:
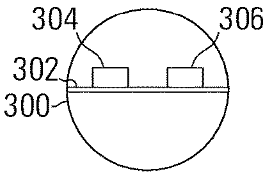
Figure 13:
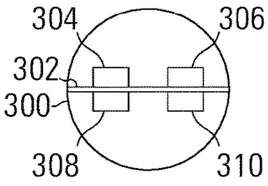
Figure 14:
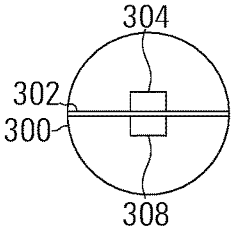
Figure 15:
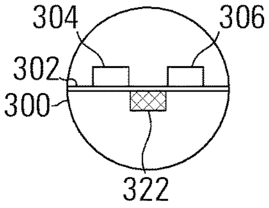
Figure 16:
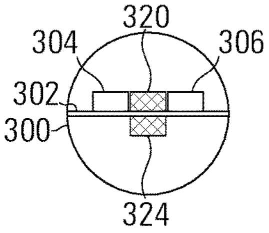
Figure 17:
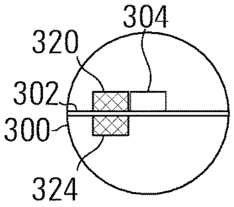
Figure 18:
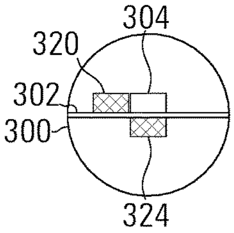
Figure 19:
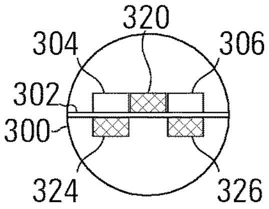
Figure 20:
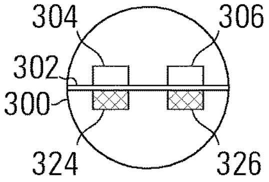
Figure 21:
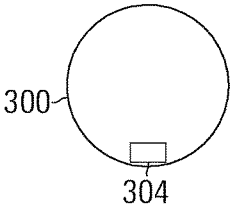
Figure 22:
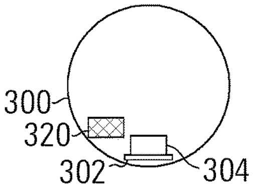
Figure 23:
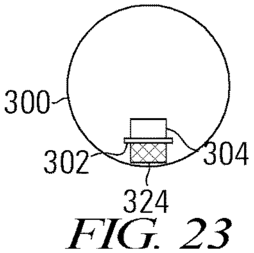
Figure 24:
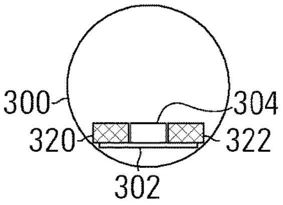

Turning now to FIGS. 9A-9B, an example embodiment is depicted of an incorrect installation circuit in a solid-state lamp replacement. As discussed above, replacement tubes can be flipped end for end without impeding current flow or correct operation. In embodiments in which replacement tubes have a pair of bi-pins at each end of the tube, tubes can be installed in two rotational positions, with each having reversed polarity. With AC-powered fluorescent tubes, either polarity of installation functions the same way. With a DC-powered solid-state lighting replacement tube, current can only flow in one direction through LEDs to provide illumination. The example incorrect installation circuit depicted in FIGS. 9A-9B provides two current paths from the power source 160 through the tube, one powering an array of LEDs 162, 164, 166, 168, 170, 172, 174, 176, 178, and another, reverse polarity, parallel path through one or more current limiting resistors 180 as needed, reverse diode(s) 182 as needed, and one or more LEDs 184, 186, 188, 190, for example red LEDs, which illuminate if the replacement tube is rotated 180 degrees during installation. This example circuit causes the replacement tube to illuminate normally if installed correctly, as depicted in FIG. 9A, by allowing current flow from power source 160 through LEDs 162-178. When installed correctly as in FIG. 9A, current will not be able to flow through the secondary path through indicator LEDs 184, 186, 188, 190, as it will be blocked both by the indicator LEDs 184, 186, 188, 190 and optional reverse diode 180, which can be included as needed based on the breakdown voltage of indicator LEDs 184, 186, 188, 190. If the tube is rotated 180 degrees during installation with the bi-pins connected to the wrong conductors in the tombstone connector, as depicted in FIG. 9B, the polarity of the power from supply 160 will be reversed, and current will not be able to flow through LEDs 162-178, but will flow instead through the path with red indicator LEDs 184, 186, 188, 190, turning the error indicators on and indicating to the user that the tube was installed incorrectly and should be rotated 180 degrees around the long axis to swap the pin connections within the tombstone connector.

Note that the number of LEDs 162, 164, 166, 168, 170, 172, 174, 176, 178 in the array is merely an example and is much lower than the number that will be included in many embodiments, and further, that multiple parallel arrays of LEDs including, but not limited to, LEDs in parallel may be provided in the primary polarity path for example but not limited to an array of red LEDs, an array of green LEDs, an array of blue LEDs and an array of white LEDs in parallel, providing for color control or color temperature control.

There can be any practical number of D1 to DN including but not limited to DX LEDs in series and parallel. In general, the LED current(s) and associated voltage(s) can be selected, but not limited to, to provide the desired performance and other desired or needed attributes, etc.

There can be any combination of resistors, diodes, and indicator LEDs in series and even parallel if needed. The diode(s) in some embodiments are optional. In some embodiments one or more Zener diodes can be added in series (or parallel in series if desired, for example one or more sets of Zener diodes connected in parallel, each set connected in series to the others). In some embodiments of the present invention, a label, sign, etc. can be added to the back side of the lamp indicating that the lamp is installed improperly and needs to be rotated 180 degrees in the radial direction. Again, due to the arrangement of the bi-pins on the Solid State/LED replacement lamps, rotations of 180 degrees about the axis will result in the same functionality of the lamp.

In other embodiments, each polarity path may be provided with identical but mirrored arrays of LEDs, so that if installed incorrectly, the replacement tube will still illuminate with the same, normally intended illumination. In this case, half the LEDs will be off and unused, but installation will be simplified, and in the event that a fault occurs in the main array paths, the replacement tube can be rotated to place the secondary arrays of LEDs into service. This rotation can be of significant value including as a built-in spare. Such a built-in spare could have many advantages including but not limited to no additional space needed for carrying spares. Minimum additional weight requirements—just another LED array or set of arrays as opposed to an entire tube and no need to locate the spare—just rotate the spare among other advantages.

Turning now to FIGS. 10-29, a number of example embodiments of replacement tubes are depicted in cross-section, end-on views, showing example, non-limiting arrangements of LEDs and incorrect installation indicator LEDs within the replacement tube. In some embodiments, the replacement tube 300 is double-sided, with arrays of illumination LEDs 304, 306 positioned on one side of a heat sink/printed circuit board 302 to provide normal illumination when the tube 300 is installed in the correct rotational position. Arrays of illumination LEDs 308, 310 can also be provided on a reverse side of the heat sink 302, to illuminate if the tube 300 is installed in the unintended rotational position. In these embodiments, the arrays of illumination LEDs can be the same or substantially the same on either side of the heat sink 302, so that the tube 300 functions normally regardless of installation orientation. Incorrect installation indicators 320, 322, 324, 326, such as, but not limited to, red LEDs or red LED arrays can be provided, to turn on when the tube 300 is installed incorrectly.

Various example arrangements depicted in FIGS. 10-29 provide different advantages and disadvantages. For example, the embodiments of FIGS. 26-29 increase the angle of illumination by positioning illumination LEDs 304 near one side of the tube 300, so illumination (shining up from LED 304 in this example) passes through more of the interior of the tube 300 and allowing it to spread over a greater angle. In some embodiments of the present invention, the incorrect installation indicator LEDs or other forms of solid state or other lighting can be a solid, constant illumination, flashing illumination, other pattern(s) of illumination and can be any type, color, wavelength, group of wavelengths, range of wavelengths, multiple wavelengths, multiple colors, etc. including but not limited to red and/or other colors.

Various example arrangements depicted in FIGS. 10-24 provide different advantages and disadvantages. For example, the embodiments of FIGS. 21-24 increase the angle of illumination by positioning illumination LEDs 304 near one side of the tube 300, so illumination (shining up from LED 304 in this example) passes through more of the interior of the tube 300 and allowing it to spread over a greater angle. Generally, illumination LEDs will only be powered on one side or the other of the heat sink 302, depending on which rotational position the replacement tube 300 is connected in the tombstone. If the tube 300 is installed incorrectly, power will flow through the secondary power path, turning on the incorrect installation indicators 320, 322, 324, 326, which can be positioned on one or both sides of heat sink 302 as desired.

Figure 25:
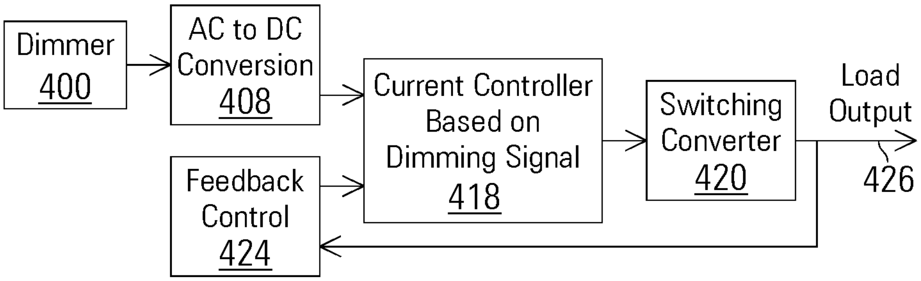
FIGS. 25-30 depict block diagrams of example embodiments of a solid-state lighting driver.

FIGS. 25-30 depict block diagrams of example embodiments of a solid-state lighting driver. Turning to FIG. 25, in some example embodiments, a dimmer 400 provides a dimming signal that can be, for example but not limited to, an example nominal 115 VAC, 400 Hz dimming signal, where an amplitude of the voltage as it is reduced from the nominal 115 VAC controls dimming of the driver and resulting illumination levels/brightness from solid state lighting connected to load output 426. An AC to DC conversion circuit 408 converts the AC dimming control signal to a DC dimming control signal in some embodiments, which is provided to a current controller 418 that controls output current based in part on the dimming signal. In other embodiments, the AC dimming control signal can be converted to any type of signal to indicate to the current controller 418 the desired dimming level, such as, but not limited to, a digital control signal, a communications bus, a wireless connection, etc. The current controller 418 controls a switching converter 420 which drives current through a load output 426. The switching converter 420 can be, but is not limited to, flyback, forward-converters, buck, boost, buck-boost, boost-buck, Cuk, SEPIC, etc. The present invention works with both isolated and non-isolated designs including, but not limited to, buck, boost-buck, buck-boost, boost, Cuk, SEPIC, flyback and forward-converters including but not limited to push-pull, single and double forward converters, current mode, voltage mode, current fed, voltage fed, etc. The present invention itself may also be non-isolated or isolated, for example using a tagalong inductor or transformer winding or other isolating techniques, including, but not limited to, transformers including signal, gate, isolation, etc. transformers, optoisolators, optocouplers, etc. A feedback control 424 can provide feedback about the load current and/or voltage or any other condition that can be sensed and that can be used to control current/voltage/power to the load.

Figure 26:
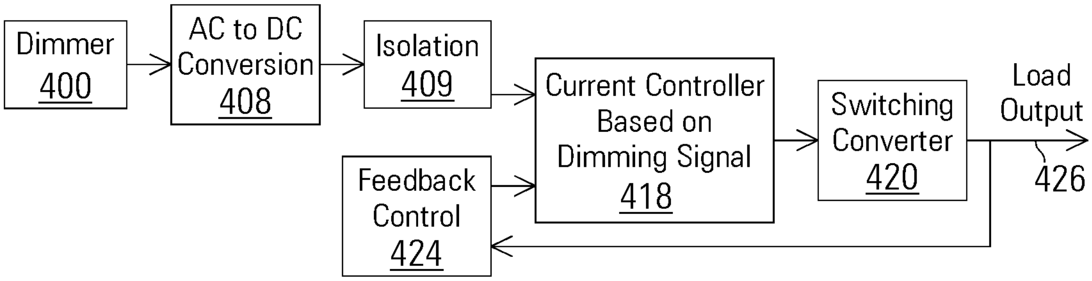
Figure 29:
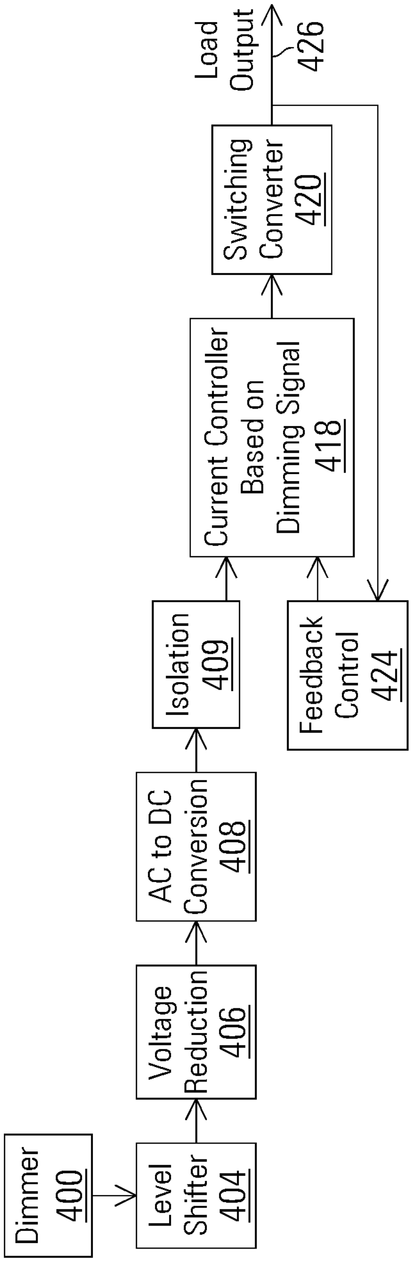

As shown in FIGS. 26 and 29, some example embodiments include optional isolation 409 between the AC to DC conversion circuit 408 and current controller 418.

Figure 27:
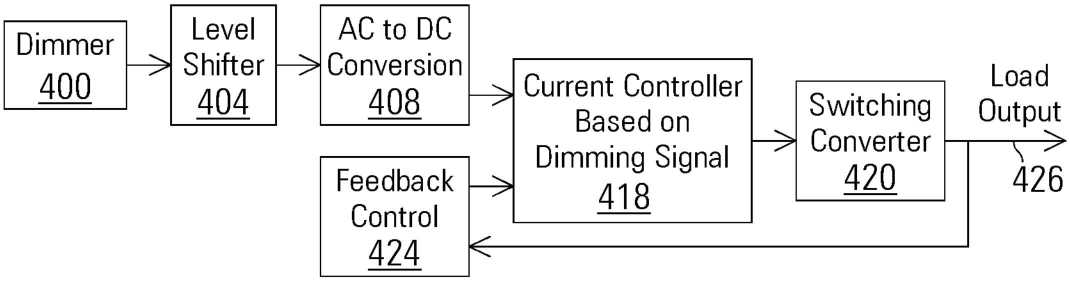
Figure 30:
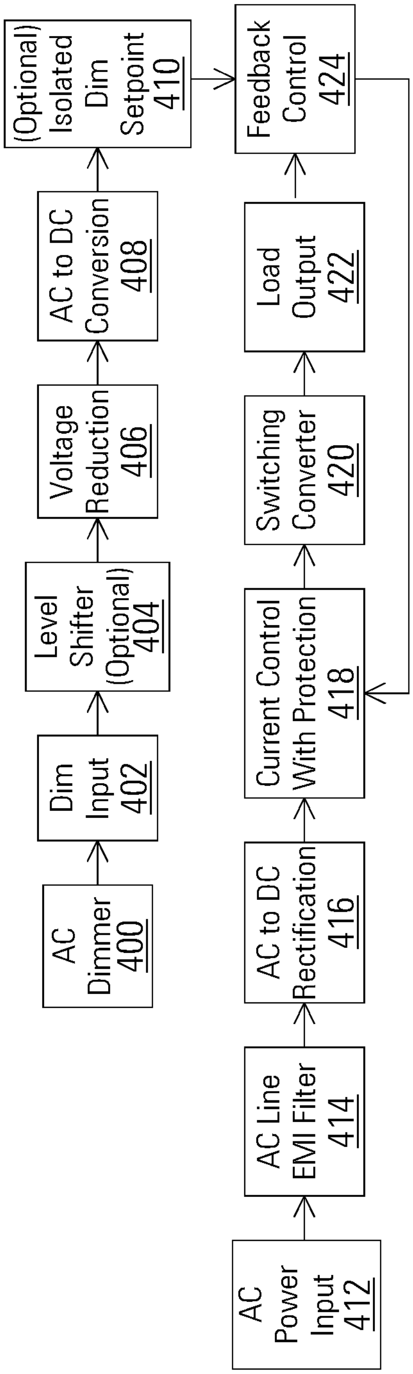

As shown in FIGS. 27, 29 and 30, some example embodiments include a level shifter 404 between dimmer 400 and AC to DC conversion circuit 408.

Figure 28:
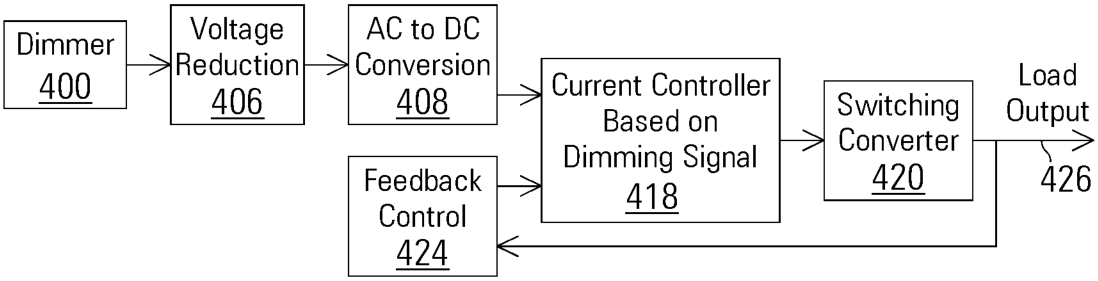

As shown in FIGS. 28, 29 and 30, some example embodiments include a voltage reduction circuit 406 between dimmer 400 and AC to DC conversion circuit 408.

As shown in FIG. 30, some example embodiments include an AC line EMI filter 414 and AC to DC rectification 416 between an AC power input 412 and current controller 418 to provide power to a load output 422 through a switching converter 420. The AC line EMI filter 414 is adapted in some example embodiments to filter EMI at/around a frequency of the AC power input 412 which, in some non-limiting examples of an avionics platform, may be around a nominal 115 VAC, 400 HZ supply. However, the AC line EMI filter 414 can be adapted to any input voltage and/or frequency of the AC power input 412.

In some embodiments, an optional isolated dim setpoint 410 can be provided to the feedback control 424 or directly to the current controller 418 to further control the dimming level.

The power supply driver is able to power and dim solid-state lighting (SSL) such as, but not limited to LED, OLED, QD, combinations of these, etc.

Embodiments of the present invention can include but are not limited to flyback or isolated forward converter and driver architecture and design including, for example, but not limited to, a buck (down), boost (up), buck-boost, boost-buck, Cuk, etc. converters.

Embodiments of the present invention can provide extensive driver/power supply protection, safeguards and fault detection/redundancy/override detection/protection/response. For example, but not limited to, the power supplies and drivers for lighting (e.g., OLED, LED, other solid-state lighting (SSL) and potentially CFL, CCFL) can be fully protected including protected against arcs, shorts, over voltage and over current, over power, etc. and can be either (or both) digital or analog controlled.

Embodiments of the present invention can provide for sophisticated, advanced, low-cost wired or powerline (or optionally wireless) control and monitoring and data and status/fault logging of each and every individual driver/power supply/module and LED lighting source including but not limited to extensive remote monitoring and control including auto/self-identification, configuring and commissioning and can also be used to monitor all key parameters including, but not limited to, input current, input voltage, inrush current, voltage spikes, power factor, true input power, Volt-Amp (VA) input power, output current, output voltage, output power, output voltage overshoot, output current overshoot, temperature at multiple locations, humidity (if desired), etc. Most of these parameters and especially the input parameters can be transmitted either as waveforms (e.g., amplitude vs. time) or as instantaneous or average data points.

Embodiments of the present invention may use different materials, devices, thermal, mechanical and electrical parts, components, subsystems, etc. that may be incorporated into the digitally addressable and controlled power supplies and constant current and constant voltage drivers. Silicon carbide (SiC) or gallium nitride (GaN)-based semiconductor power devices including diodes and transistors may be used with the present invention to increase efficiency, switching frequencies and reliability while reducing size and mass and waste heat.

Some implementations of the present invention may use redundant circuits within a module or modules or redundancy in the modules so that if one circuit or module, respectively, fails, overheats, degrades, etc., the system can automatically switch over to the other circuit or module, respectively and can provide status and diagnostics including manual override of any automatic operation and remote reprogramming if deemed necessary.

The present invention can use, where appropriate, 'self-configuration', where a smart module will automatically self-configure itself to the type of fixture and be able to recognize how it fits into the configuration of the lighting in an aircraft, a room or area in an aircraft, in a building, in a ship, in an airplane, in a hotel, in a home, in a hospital, in a school, etc., any other type of building, facility, etc., in an outdoor setting, including but not limited to concerts, events, camping, mobile living, temporary living, field hospitals, military mobile units, others discussed herein, combinations of these, etc.

In the case of a power failure, there may be a short interruption, therefor implementations of the present invention can be designed to anticipate the possibility of a short interruption and not be negatively impacted, affected or impaired by such an interruption and could have, for example but not limited to, non-volatile memory to backup and maintain pertinent information including setup and self-configuration/identifying/addressing information, etc.

Any form, type, protocol, interface, etc. may be used for communications including, for example, but not limited to, RS485, CAN, DMX512, powerline control (PLC), 0 to 10 V, pulse width modulation (PWM). Implementations of the present invention may use wiring redundancy and data redundancy.

Embodiments of the present invention can self-configure without user interaction. Some embodiments of the present invention may use an electronic identifier for each module or a physical connection to its neighbors to set, determine, ascertain, etc. such information as part of the automatic self-configuration. Dimming can be from approximately 0% to 100% using, for example, but not limited to, pulse width modulation (PWM) or 0 to 10 V or other analog and digital dimming methods, protocols, approaches, methods, techniques, etc.

Implementations of the present invention include but are not limited to constant current source(s) with adjustable current setting and adjustable compliance (i.e., maximum) voltage settings that supports analog and digital dimming coupled with, for example, being dynamically adjustable and programmable. For example, a buck converter can be used to provide a constant output current to convert the input AC voltage down to a lower DC voltage at the desired constant current which can also be PWM digitally dimmed or optionally analog dimmed. In general, the AC to DC buck converter works equally well as a DC to DC buck converter. In other embodiments the buck converter can be replaced with other types of non-isolated converters such as boost, buck-boost, boost-buck, Cuk, etc. or an AC to AC or AC to DC or DC to DC isolation converter which, for example but is not limited to, can consist of one or more individual or power combined forward converters of any type including but not limited to a low noise, low EMI, current fed forward converter(s) or flyback converter(s).

The SSL/LED lighting and associated electronics including drivers, power supplies, controls, etc. can be in any number of standard form factors including but not limited to T8, T10, T12, T5, T4, PL 2 pin and 4 pin, A lamp (E26 base), PAR 30, PAR 38, BR30, BR 40, R20, R30, R40, 2×2 ft panels, 2×4 ft panels, etc. in any white color temperature or color temperatures, etc. color including but not limited to RGB, RGBA, RRGBA, with or without other colors as discussed herein, UV including but not limited to UVA, UVB and UVC, IR as well as custom form factors.

The present invention can use total internal reflection to reflect, redirect, homogenize, prevent glare, effectively and efficiently diffuse the light so that the light is directed 'downward'. In some embodiments of the present invention, the reflector can be 'leaky' and allow some of the light to be transmitted at certain or even all locations of the 'reflector'.

In some embodiments of the present invention, additional light can be from other sources of light or even information content light sources that can be attached, connected, etc. to the present invention.

The present invention can use wireless, wired, powerline communications, etc., combinations of these, etc.

The present invention can use heat sinking, reflective light bar(s), printed circuit board(s) PCBs, etc.

The present invention can have flaps that can be but not limited to manually, automatically controlled including but not limited to motorized, accordion-like flaps, folded, steered, etc.

The present invention can be used as a personalized lighting source—for example, but not limited to, a desk lamp, a task lamp, a table lamp, etc. The present invention can also be used as a wall mounted lamp, a cubicle mounted lamp, a cubicle top mounted lamp, a ceiling mounted lamp, etc., a mid-level lamp, combinations of these, etc.

Materials can be used including but not limited to metals, plastics, 3D printed/additive manufacturing metals, insulators, etc., combinations of these, etc., alloys, compounds, etc.

Embodiments of the present invention can be but are not limited to hung, suspended, wall mounted, ceiling mounted, supported by a base, stand, etc.

Embodiments of the present invention can have slits or similar constructions that allow partial or complete transmission of light from the reflector. Such slits or similar construction can for example but not limited to be fixed or varied. Such varied operation can be but is not limited to automatic, controlled, manual, etc.

Any number of wavelengths/colors of one or more light sources including but not limited to SSL including but not limited to LED, (Organic Light-Emitting Diode) OLED, Quantum Dot (QD) of any type, form, make function, etc. including but not limited to any type of phosphor(s), phosphor coating(s), UV, LED, etc. may be used in/with the present invention.

The present invention can be used to make color temperature, color tunable hybrid of solid-state lighting (SSL) including but not limited to LEDs and OLEDs. Examples of the present invention include blue LEDs with amber (or yellow, orange, etc.) OLEDs to produce various color temperatures ranging from low kelvin to high kelvin which can be flexible, etc. The present invention can use edge lit, back lit, other configurations, etc., combinations of these, etc. In some embodiments of the present invention, blue LEDs can be used with red and green OLEDs or other combination of one or more OLEDs.

Example solid state light devices in which light from multiple SSL elements can be combined to yield light of a desired color temperature and/or color. For example, yellow light from one or more OLED panels can be combined with blue light from LED arrays to produce white light of a desired color temperature. For example, white light is produced from the top of the devices. In some embodiments of the present invention, for example but not limited to, the light can be fed into a reflector which redirects the light downward into a room or onto a surface. In other embodiments of the present invention, the structures can be inverted so that the light is aimed/pointed downward for ceiling uses, purposes, applications, etc. In still yet other embodiments of the present invention, the structures can be orientated vertically on for example but not limited to walls or any other orientation, angle, direction, etc. such that the light emitted from the structures is delivered where desired and intended.

In some embodiments of the present invention, the present invention can be made of OLEDs only with independent color/wavelengths/etc. of that are sealed separately and stacked on top of each other. In other embodiments yellow OLEDs and blue LEDs are used.

In some embodiments of the present invention, blue, amber/orange, yellow and combinations of one or more white color temperatures may be used.

In some embodiments of the present invention, blue, yellow and/or one or more white color SSLs which consist of a combination of LEDs and OLEDs can be used. Violet LEDs as well as LEDs in the range of blue to violet even approaching the ultraviolet or even into the ultraviolet including but not limited to UVA, UVB and UVC can also be used.

Either or both of the OLED and the LED can be on flexible, bendable, rigid, etc. substrates including light waving and light guiding. In some embodiments, the OLEDs can be a mixture of red and green allowing color temperature tuning. In other embodiments of the present invention, the OLEDs can be separate layers, on separate substrates, separate panels, etc. allowing for color temperature tuning and/or color tuning. In other embodiments the red and green can be fixed amounts, values, compositions, layers, stacks, etc.

Due to the high photon count and efficiency of blue LEDs and the high photon count and efficiency of green and red OLEDs, the present invention can be very high efficiency including lumens/watt.

Again, embodiments of the present invention can consist of one or more OLED panels alone, one or more LED panels/sources/etc. alone or a combination of one or more OLED panels and one or more LED panel/source/etc.

The OLEDs and LEDs may be integrated, incorporated, etc. into each other. Power supplies, drivers, control, sensor electronics, etc. may also be incorporated into embodiments of the present invention.

Flexible, thin, ultra-thin, rugged, taking the best of both LEDs and OLEDs including as individual or combined panels, sources, etc. including but not limited to separate controls, electrodes, leads, etc. for each color, wavelength, etc. In some embodiments, phosphors including remote phosphors may be used.

Embodiments of the present invention can be ultra-thin, flexible, transparent, bendable, designed to have light come out more than one direction, can use LEDs of any size, shape, form factor, etc. including surface mount, planar, edge emitter, through hole, micro LEDs, any type of package, form factor, etc. Embodiments of the present invention can use back lit, edge lit, etc., combinations of these, etc. for the LEDs or other similar SSLs including but not limited to QDs, ELs, etc.

Embodiments of the present invention can be made in wearables, clothing, jewelry, etc., combinations of these, etc.

Embodiments of the present invention can use an OLED with a reflective mirror-like bottom layer with one or more LED 'layers' on top of the OLED layer. The LED layers could, for example, but not limited to be made of edge lit configuration in which the medium (e.g., but not limited to acrylic or glass) used is transparent to the OLEDs and allows the OLEDs when lit to transmit through the acrylic, Plexiglas, other plastics or polymers, quartz or glass, etc. Such acrylic or glass or other material can be rigid or flexible, etc. as well as the one or more OLED layers.

In some embodiments of the present invention the substrate for the OLEDs may also be used as the light transmission layer for the LEDs including but not limited to edge lit and/or back lit.

In some embodiments of the present invention, all of the layers can consist of OLED stacked separately; in other embodiments of the present invention all layers can consist of LEDs stacked or arranged in edge lit or a combination of edge lit and back lit; in other embodiments of the present invention, the layers can consist of a combination of LEDs and OLEDs; in even other embodiments of the present invention, the layers can be made of one of more of LEDs, OLEDs, quantum dots (QDs), phosphors.

Embodiments of the present invention can have high color rendering index (CRI) approaching up to 100.

The present invention may be driven, supplied with power, etc. from one or more sources including individual channels of linear and/or switched power of, in general, any type or form.

AC to DC, DC to DC converters, etc. can be used to drive, supply power. The present invention can be dimmed including by analog, digital, pulse width modulation (PWM), etc., combinations of these, etc.

The layers of the present invention can be individually or collectively dimmed, trimmed, etc.

Embodiments of the present invention can support dimming, trimming, min/max setting including but not limited to digitally, analog, PWM, duty cycle, etc., combinations of these, etc.

Embodiments of the present invention can be voice activated, voice controlled, gesture controlled, can work with sensors, can incorporate sensors, can be IoT, can have colors to indicate status, can have temperature, humidity, smoke, fire, daylight, optical, gunshot sensors, detectors, can automatically turn on, turn off, can be remotely dimmed, trimmed, color temperature, color tuned, can have many colors, etc. Can be wired, wirelessly, power line communication, combinations of these, controlled, monitored, powered, etc.

The above is intended to provide some examples of the present invention. Nothing of/in the above shall be interpreted as limiting in any way or form.

Embodiments of the present invention can optimize total lumens as well as but not limited to delivered, light, spectrum, direct light, useful light, etc. Can also optimize delivered light, CRI, spectrum, issues with blue light.

Can support circadian rhythm, human centric, health and well-being, etc.

The present invention includes glare free white spectrum power distribution and multichannel direct emitter LED light sources that are extremely high efficacy with associated drivers and power supplies that achieve a flicker free SSL system and associated environment and platform.

Embodiments of the present invention include high efficiency, high quality, high performance, economical SSL systems including but not limited to the lighting, itself, the electronics including the drivers, power supplies, controls, sensors and other associated components including how the SSL interacts with occupants including personalized desk and task lamps. Embodiments of the present invention include inexpensive, 3D-printed/additive manufactured, lightweight, and easy to manufacture materials that manage and control the light from the LEDs efficiently that exit the luminaire in a completely glare free with complete color temperature mixing and a very high degree of lux uniformity on a surface below the luminaire. These SSL IoT luminaire systems efficiently control the photon distributions with reduced complexity.

Additive manufacturing for lighting products to enable reduced part count, more efficient production and more enhanced options and uses including on-demand semi-custom production.

Implementations of the present invention include spectral power distribution of light sources and reflective spectra of interior surfaces that more efficiently deliver lighting to the target, deliver a more suitable spectrum to the target, and/or deliver a more suitable light intensity for the application. In addition to lighting and daylighting optical distribution. The present inventions can include and incorporate electrical and architectural integration concepts that improve efficiency or building resiliency that enable more effective and efficient lighting layouts in a commercial space. Circuit topologies and architectures for SSL drivers enable smaller form factors with highly efficient operation across the entire operating range of both input voltage and spectral power distribution with high CRI including for alternating current (AC) implementations, high power factor, low harmonic distortion, and no detectable or measurable optical flicker. The present invention can also use and incorporate one or more of OLEDs, quantum dot (QD) emitters, perovskites, other electroluminescent (EL) emitters, mini-LED arrays, micro-LED arrays & LED edge-lit waveguides.

The present invention is scalable and suitable for both 3D-Printing/Additive Manufacturing and conventional manufacturing and provides glare free, spectrally tunable, highly area lux uniform lighting with high color rendering index (CRI) and can also serve as an IoT/sensor platform and can provide alerts, information, wayfinding, -personalized and well-being lighting.

Embodiments of the present invention can be used for other purposes than as a solid-state lighting/LED fluorescent lamp replacement. SSL provides quality benefits for general lighting in residential and commercial and military and defense applications that are not possible using other types of lighting. Improved visual quality is a result of several intrinsic characteristics of SSL. Specifically optimized to enable and exploit the form factors and inherent flexibility and digital nature of SSLs, tremendous design flexibility is an inevitable result, thereby creating the possibility of new and innovative lighting design approaches and architectural integration. Also, SSLs enable lamps with superior color attributes. These superior color attributes include user-adjustable and selectable RGB and higher channel color/spectral and high 'white light' CRI color temperature tunability.

SSLs not only eliminate hazardous material but also embed less energy in the manufacturing and transportation processes. These intrinsic features are expected to allow continued price reductions as SSL technology proliferates. A reduced total-cost-of-ownership/return-on-investment that intelligent tunable SSL provide permit customers who are concerned with energy, installation and maintenance costs of lighting to reap the benefits compared to other legacy lighting including increased energy savings, higher levels of sustainability, improved lighting quality, improved efficiency, enhanced health and well-being, human centric based lighting, growth lighting, spectral tunability, user-adjustable, friendly and other enhanced lighting options.

In some embodiments of the present invention all of the electronics can be integrated into the fixture including the multichannel drivers. In some embodiments of the present invention all that is required to power the fixture (including 'everything'—the internal multichannel drivers, the sensors, the Internet of Things (IoT), any and all wireless communications, alarms, sirens, etc.) are two wires (+ and −) that come out of the fixture and go to a local or remote power source.

In some embodiments a universal socket allows access to the on-board integrated controls with practically any wireless or wired chipset/protocols such as, but not limited to, 0 to 10 V, CAN, RS485, DMX512, Bluetooth, Bluetooth Low Energy (BLE), WiFi, LiFi, LoRa, Thread, Sub-GHz, ZigBee, ZWave, etc.

Connected code that allows the general categories of desk lamps, task lamps (mid-level lighting) and ceiling level lighting including the glare free luminaires and other SSL including LED troffers and intelligent/smart fluorescent lamp replacements (iFLRs) including Type A & Type C iFLRs to intelligently connect to each other. Desk and task lamps can be connected with existing 'ceiling' fixtures.

Implementations of the present invention can incorporate Wayfinding in the glare free lighting.

Waterproof versions of the glare free general categories including glare/flicker free desk lamp. Look at achieving IP67, IP68 and possibly IP69 ratings.

Embodiments and implementations of the present invention can incorporate ultraviolet LEDs for hygiene, sterilization especially with the threats of viruses, UV light including UVC and, in general, 200 nm to 400 nm light waves, done at the appropriate times with no humans/animals nearby could be extremely effective in aircraft, planes, helicopters, other fixed wing aircraft, ships, boats, hospitals, clinics, virtually every public (and private too) place such as, for example, but not limited to movie theatres, sports and other arenas, libraries, airports, bus stations, grocery stores, department stores, hardware and self-improvement stores, auditoriums, restaurants, cafeterias, office and work spaces, warehouses, etc. Can have failsafe sensors, controls, detectors, monitors, etc. including redundant ones to ensure no human or animal is present or within range of the UV light source. Can use an indirect UV/direct visible light arrangement with or without active forced air. Can monitor the dose (intensity time duration) of the UV light, etc. Can use gaseous UV sources including but not limited to mercury containing with noble gases such as argon light sources or solid-state LED emitters or combinations of both. Can us signaling/messaging for emergencies, hearing impaired, etc. There are numerous uses/applications for the bottom ('dead space') of the LED array support for which there is no direct light emission in the non-glare SSL/LED products. These include but are not limited to messaging, wayfinding, sensing, sterilization, personal and public policy safety and signaling, etc.

Embodiments of the present invention include families of highly efficient, high lumens/watt (lm/W) spectrally tunable & dimmable SSL products that offer higher lm/W than typical SSL desk or task, table or other such lamps.

3-D printing to make the desk or task or other lamps with various widths of 'dead space' support structures for the LED arrays. The one or more 'dead space' support structures can have various gaps between them. The 'dead space' can be used for additional lighting including but not limited to back lit LEDs, edge lit LEDs, OLEDs, QDs, combinations of these, etc., sensors of any type, form, function, operation, purpose, etc. including but not limited to those discussed herein.

The desk, task, table or other lamp that also accepts other materials for the reflective lid/canopy that can have an optical transmitting component (to mitigate/avoid the cave effect), have very low absorption and high reflectivity. Note the desk, task, etc. lamps can be designed and implemented so that the lid/canopy is, for example, but not limited to, not necessarily a mechanical/structural component thus allowing a vast and diverse number of materials including thin flexible reflectors, patterned films, even, in some embodiments, cardboard. Ways to secure the lid/canopy so that it cannot be (easily) removed to avoid direct exposure to the LED arrays can also be used.

Some non-limiting example uses/purposes for the 'Dead Space' beneath (the other side of the LED support that is facing downward) such as visual messaging using alphanumeric LEDs, warning signals/lights, alerts, wayfinding, IoT sensor arrays, gesturing, occupancy/vacancy detection, HVAC/BACNET communications, UV sterilization (carefully and safely implemented with for example person/animal detection to avoid UV exposure).

Different reflective lids/canopies for the desk lamp including but not limited to totally reflecting with nearly 100% reflection; partially transmitting with low absorption and the rest reflection including patterns or images that are illuminated by the transmitted light/photons, adaptable patterns, beam steering of the transmitted light can be used.

Implementations of the present invention can also use thin DC-DC converters/drivers that are highly efficient, support for example but not limited to up to 8 or more channels of constant current dimmable independent outputs including integrating the drivers with the LED arrays.

The intelligent connected lighting platform can be designed to provide just-in-time manufacturing including additive manufacturing.

The present invention allows the application of lighting application efficiency (LAE) which characterizes the efficient delivery of light from the light source to the lighted task. LAE can also account for the effectiveness of the light spectrum for the lighting application and the ability to actively control the source to minimize energy consumption when the light is not being used. Optical design can also allow more efficient delivery of light with the optimum optical distribution. Precise spectral control can be used for the present invention that enables delivery of more suitable light for the application needs and buildings occupants. Instantaneous control over a wide range of intensity provides the ability to deliver the right amount of light on demand. The present invention including but not limited to task lamps, cubicle lamps, wall lamps, mid-level lamps, desk lamps, etc. can be part of LAE.

Implementations of the present invention include but are not limited to communications interface to the driver boards to support a broad range and type of wired and wireless communication protocols and communications interface including but not limited to BLE, WiFi and ZigBee that can for example but not limited to incorporate IoT motion, daylight harvesting, temperature, humidity and proximity sensors into for example but not limited to multichannel drivers.

In some embodiments of the present invention, a 3-D printed or otherwise manufactured SPD Glare Free Desk Lamp with 'dead space' support area is populated with IoT sensors. A non-limiting example is a full color SPD tunable glare free desk lamp with sensor status/value via either BLE or WiFi.

Intelligent fluorescent lamp replacements (iFLRs) as the ceiling or other location lamps including but not limited to aircraft personnel locations and cargo locations, cockpit, sleep areas, food preparation areas, etc. above the area with the intelligently connected glare/flicker free desk lamp is located including with on-board IoT sensor proximity detection such that the iFLRs dim and the glare/flicker free Desk Lamp lights up when the glare/flicker free Desk, Task, Table, Mid-level, Cubicle and/or other Lamp IoT sensors detect the presence of a person in the vicinity of the Desk, Task, Table, Mid-level, Cubicle and/or other Lamp. Conversely when the glare/flicker free Desk, Task, Table, Mid-level, Cubicle and/or other Lamp IoT sensors detect a person is leaving the Desk Lamp dims off and the ceiling lights light levels increase for a minute or two and then dim down to a lower level then when the person was detected by the Desk, Task, Table, Mid-level, Cubicle and/or other Lamps.

For example, an embodiment of the present invention could include an 8-channel glare free 3-D printed desk lamp with uniform color mixing.

Non limiting examples of the IoT sensors include motion, non-camera-based person/people-detectors, ambient light Lux, SPD, UV, temperature, humidity, pressure, Doppler shift, time-of-flight (ToF), smoke, ultrasound, noise, liquid, moisture, water flow, etc. These sensors are used in the three types of systems/platforms including but not limited to 1: autonomous; 2: touchscreen, computer or remote; and 3: Local Area Network (LAN), server and/or cloud based. The cloud-based platform, could for example but not limited to support BLE and/or WiFi IoT sensors including the subset of IoT sensors mentioned herein including but not limited to being intended for smart restroom applications which are based on SSL lighting platforms to provide local to Cloud (or Server) connectivity and two-way communications.

Fluorescent lamp replacements (FLRs) which are dimmable and/or color temperature or color changing/tuning offer smart/intelligent programmable options including being able to use wired and wireless control/communications protocols and standards. These intelligent FLRs (iFLRs) can provide the 'ceiling' SSL lighting that is connected with and communicates wirelessly with the intelligent Glare/Flicker-Free Desk Lamp including the IoT sensors that determine whether people are present or nearby and accordingly controls the ceiling lights to optimize light quality, light usage, energy conservation, quality and quantity of light, etc. to provide SPD tunable light where and when it is needed.

Embodiments of the present invention can be wirelessly dimmed and can support both manual and daylight harvesting controls, including standard 0 to 10 V, DALI, DMX, and other interoperable protocols and interfaces including, but not limited to, interfaces that support standards including Building Automation Control Network (BACnet) and can be used and be interoperable with other building automation system (BAS) vendors, manufacturers, suppliers, etc. The control interfaces allow multiple control systems manufactured by different vendors to work together, sharing information via a common LAN, Web, Cloud or other-based interface. Integration of energy-saving controls and sensors enable utilization of the LED properties and save additional energy. Highly-optically transparent inert polymers can also be used to protect the SSL from the environment including dust, dirt, humidity, liquids, etc.

Controls including, but not limited to, touchscreen, mobile, computer, LAN, server and/or cloud based including for LEDs and/or OLEDs+LEDs, etc. can be incorporated into embodiments of the present invention.

Other embodiments of the present invention include flexible thin SSLs including color temperature tunable and nearly indestructible LED-based back-lit and edge-lit very flexible, very-low glare and totally waterproof lighting.

Embodiments of the present invention are suitable for all types of SSL including LEDs, OLEDs, QDs, mini & micro-LEDs & other SSL emitters. Submerged in water, frozen and driven over or placed under heavy objects including automobiles, vehicles, trucks, cars, etc., these flexible SSL continue to keep on flexing, bending and lighting without damage and remain completely functional. Layer by layer nanoparticle incorporation profile processes that can also be used and scaled to mass/volume production using low-cost equipment and facilities.

The present invention can include but is not limited to ultra-efficient, no-hot spot, 'glare free', 'flicker free' uniform, tunable SSL light sources, engines, modules, and luminaires that can be used & incorporated into lighting luminaires, systems & platforms.

The control and monitoring interface and control strategies performs and permits 'self-configuration' where the smart module will configure itself to the type of fixture and recognize how it fits into the overall, local, and/or global, etc. configuration of, for example, but not limited to, the SSL/LED lighting as well as, for example, attempt to prevent SSL LED junction overheating of the SSL/LED lighting while delivering maximum possible lifetime including under all conditions such as full on, flashing, maximum (deep) dimming, short detection, short circuit protection, etc.

Implementations of the present invention can use various 'IDer' and addressing/self-configuration approaches including but not limited to those discussed herein. Some embodiments can employ RS485 or RS485 derivatives including Profibus and Modbus as well as other serial protocols/interfaces. Implementations of the present invention can have redundant circuits within a modules or redundancy in the modules so that if one circuit or module, respectively, fails, overheats, degrades, etc., the system can automatically switch over to the other circuit or module, respectively and can provide status and diagnostics including manual override of any automatic operation and remote reprogramming if deemed necessary. The redundant modules can be built in or be stackable and hot swappable.

Smart control of lighting can be used to dim and/or turn the lights on. A smart lighting solution can provide control and dimming of lighting fixtures and associated circuits down to individual light/circuit level. This can be through a standardized smart module that can recognize the lighting package configuration and what type of light fixture it is controlling through embedded firmware/software. This allows lights of different functions and power requirements to be, for example, but not limited to, 'daisy chained', significantly reducing cable runs and installation costs.

Dimming can be from 0% to 100% brightness using, for example, but not limited to, pulse width modulation (PWM) and can cover orders of magnitude. Flashing can be 90 flashes per minute (fpm) at 50% duty cycle for some fixtures. The consolidated control of the total system can be over Local Area Network (LAN).

Automatic self-configuration and installation including no single points of failure is part of the present invention.

The present invention can drive any of the fixtures and associated LED strings and automatically recognize, identify and self-configure to the fixtures while providing extensive input and output protection and bi-directional control, monitoring and status communications.

Numerous topologies can be used with the present invention. Three of these topologies are buck converter, boost converter and buck-boost converter. For a buck, the input voltage must be higher than the output voltage. For a boost converter, the output voltage cannot be lower than the input voltage. For the buck-boost converter, the restrictions on the input and output voltages are removed and the output voltage can range from lower to higher than the input voltage. In some applications, the buck converter circuit approach would yield the highest efficiency and put the lowest stress on the components.

All circuits, drivers, power supplies, etc. can have: Over-current Protection (OCP), Over-voltage Protection (OVP), Over-temperature Protection (OTP), Short Circuit Protection (SCP), Arc Detection/Protection (ADP), Transient Surge Protection (TSP), Circuit Breaker Protection (CBP), Electronic Circuit Breaker Protection (ECBP), Fuse Protection (FP), Relays, Other forms of redundant/multiple forms of protection, Alerts, Potential additional 'Protection Buses' with low power wiring, Additional modes of protection can include Alarms, Status modes, override modes, and can be adapted with no single points of failure.

The non-limiting electronics depicted in the above block diagrams can have protection including but not limited to fuse including both one-time and resettable fuses, thermal and/or thermal-magnetic, circuit breaker, transient voltage suppressors (TVS) such as varistors and metal oxide varistors (MOVs), surge protectors, Over current Protection: (OCP); Over voltage Protection: (OVP); Over temperature Protection (OTP); Short Circuit Protection (SCP); Arc Detection/Protection (ADP); Transient Surge Protection (TSP); Circuit Breaker Protection (CBP); Electronic Circuit Breaker Protection (ECBP); Fuse Protection (FP); Relays and/or Transistor Switches. In addition, extensive current, voltage and temperature monitoring can be implemented. In addition, protections to implement, which protections to have override capabilities, which protections to be programmable, software or firmware enabled, etc. can be included in embodiments of the present invention.

In some embodiments of the present invention, a combination of a voltage to voltage converter including but not limited to AC to DC, DC to DC, DC to AC, AC to DC, etc. using for example but not limited to Buck, Boost, Buck/Boost, Boost/Buck, flyback, forward converters, Cuk, converters, inverters in general, others discussed herein, etc. can be used in conjunction with a linear regulator including a linear regulator that provide pulsed, PWM, continuous, etc. operation modes, etc. Embodiments of the present invention can set the output of the converter or inverter, etc., to be slightly higher than the SSL or other load such that the voltage drop across the SSL including but not limited to LED, OLED, QD, QLED, other loads, etc. In general, any type of converter and/or inverter architecture/topology can be used, employed, applied to the present invention.

Powered by the LED driver using the methods of the present invention, the lighting of the present invention can be changed from warm to cool or color temperatures in between as well as flashing the lights, adding color to the lighting such as but not limited to red or flashing red for alerting, green for okay and safe, yellow for transitioning, unsure, changing states, etc., other colors, etc., providing information, pulsating and/or strobing at uncomfortable rates and frequencies for humans as, for example, a self-defense mechanism, an offensive approach, etc. Embodiments of the present invention can be combined/coupled/connected/etc. with sirens, speakers, IoT, etc. and other such devices, sensors, detectors, alerts, alarms, sound, noise, siren, power, speaker, broadcast, etc.

In some embodiments of the present invention the electronics that control/allow/permit/support/etc. the color temperature/color tuning of the present invention can be built on the same media/substrate/board/etc. as the LEDs and/or other SSLs. Such electronics can be used to, for example, but not limited to, control, monitor, etc. the ratio of warm to cool channels of lights, the mode, flashing, flickering, strobing, etc., additional colors such as red, green, blue, amber, etc., the temperature, the humidity, sense the color temperature at various points including direct, reflected, scattered, etc. light, smoke, air quality, number of people, carbon monoxide and carbon dioxide, dust, etc.

In some embodiments of the present invention the light sources/detectors/etc. can be synchronized via for example but not limited to wired, wireless including RF, microwave, millimeter wave, submillimeter wave, THz, other wavelengths, frequencies, etc. of the electromagnetic spectrum, etc., optical, etc. including BLE, WiFi, RFID, Bluetooth, LoRa, Thread, LoRa, other low energy wireless communications, etc.

In some embodiments a circuit can be used to detect the characteristics and, for example, turn off or bypass the alternating current and provide direct current or a switch, either manually or automatic, can be used to switch from alternating to direct current (voltage).

In still yet other embodiments a circuit can be programmed including but not limited via firmware, software or hard wired using a PROM, EPROM, EEPROM, FLASH or other nonvolatile memory, etc. to automatically detect and switch from alternating current (voltage) to direct current (voltage) or direct current (voltage) to alternating current (voltage) depending on the type of light source(s).

Embodiments of the present invention can include features of and be used in a number of systems, such as embodiments of cubicle top lighting disclosed in U.S. patent application Ser. No. 15/885,788 filed on Jan. 31, 2018 for a "Solid State Luminaire Lighting System", safety systems disclosed in U.S. patent application Ser. No. 16/147,561, filed Sep. 28, 2018 for a "Universal Solid State Lighting System", safety systems disclosed in U.S. patent application Ser. No. 15/586,216 filed May 3, 2017 for "Safety Lighting and Monitoring", dimming systems disclosed in patent application 61/652,033 filed on May 25, 2012, for a "Dimmable LED Driver", lighting communication disclosed in PCT Patent Application PCT/US15/12965 filed Jan. 26, 2015 for "Solid State Lighting Systems", lighting mounting systems and fluorescent replacements disclosed in PCT Patent Application PCT/US15/32763 filed May 27, 2015 for "Lighting Systems", flexible lighting fixtures disclosed in PCT Patent Application PCT/US17/36455 filed Jun. 7, 2017 for a "High Capacity Flexible Lighting Fixture, System and Method", which are all incorporated herein by reference.

Particular embodiments depicted and disclosed herein are merely examples and are not intended to be limiting, but can use a switch including, for example, a transistor such as a field effect transistor (FET) such as a MOSFET or JFET to, for example, either turn on or turn off a circuit that operates in either ballast mode or AC line mode, DC mode or other mode depending on the amplitude of the signal or with the inclusion of a time constant, the average, RMS, etc. voltage level. The circuits remove the requirement that a reference level and a comparison to the reference level are required to detect the amplitude of the waveform.

An AC input can be connected, for example, to the pins in a fluorescent light fixture, either with a ballast in place or removed/bypassed. Fuses provide protection, and AC coupling capacitors are provided in some embodiments at the input. A diode bridge rectifier can rectify the AC input, yielding a pre-LEDP voltage. A series diode is provided in some embodiments, yielding output voltage LEDP to output. A filter capacitor can be provided across the output between output nodes LEDP and LEDN. In some embodiments, a current sense resistor is provided in series with the output.

In some embodiments, a startup sequence circuit for a solid-state fluorescent replacement can be included. The startup sequence circuit generates a pulse sufficient to allow ballasts of certain types including certain rapid start ballasts to operate correctly.

In some embodiments, a startup power detection circuit can be included, such as, but not limited to, that disclosed in PCT Patent Application PCT/US15/32763 filed May 27, 2015 for "Lighting Systems" which is incorporated herein by reference for all purposes.

The present invention can be used to provide the electronics for a direct fluorescent lamp replacement that uses for example LEDs or OLEDs or both or QDs or combinations of these, etc. The AC (low 50 or 60 Hz) frequency or electronic ballast (high typically ~30 to 100 kHz) frequency can be detected using for example but not limited to a microprocessor, microcontroller, FPGA, DSP, ASIC, IC, etc. or combinations of these, etc.—such a detector (using for example a microcontroller or microprocessor, etc.) can also be used to provide the functions disclosed herein.

As some ballasts perform various status, fault, failure, protection detection, sensing, and correction, embodiments of the present invention provide the necessary electronics, circuits including either in analog and digital (or both) implementations and associated firmware/software if needed to provide the proper sequence so that the ballast performs properly with the present direct replacement LED FLRs including rapid start ballasts. For example, circuits in the startup sequence circuit can generate a pulse sufficient to ballasts of certain types including certain rapid start ballasts to operate and provide power to the present invention. In addition, remote operation including dimming or intensity level changes can be performed, as well as remote monitoring. Remote dimming/level changes can be accomplished for example by, for example but not limited to, inserting the output of a wireless receiver either with a built-in or separate digital to analog converter (DAC) such that the DAC is controlled by the received information from the receiver such that the output of the DAC which is connected to the input of resistor provides the programmable/controllable reference signal/voltage used to set the output current to the LEDs or OLEDs for these embodiments of the direct replacement FLR present invention. An RC circuit can be used to provide a temporary recharging voltage should the DAC (and therefore the output current) be commanded to zero. Notably, more than one DAC can be included for, for example, multi-channel uses in/with the present invention as well as analog to digital converter(s) (ADC(s)) to read various settings and operational info and report this back for example using a transceiver or transmitter, etc.

Low voltage (e.g. 12 V, 20 V, 24 V, etc.) AC and DC lighting systems and components including MR16 can also be used for the present invention including RGBW and the use of RGBAW (i.e., R and/or A (amber) and in some cases G to produce yellow for night time, sleep time, sleep, etc. mode and BW to produce light suitable for wake up mode) as well as RGBW and the use of RGBAW with more than one white color temperature which can be in any form and could include but is not limited to a wireless or wired or powerline control (PLC) receiver, transceiver, transmitter, etc. Although a low voltage MR16 was discussed, the present invention also equally applies to all types and forms of general lighting including, but not limited to, GU10, A-lamps, E26 socket lighting, E27 socket lighting, PAR30, PAR38, R30, T12, T10, T9, T8, T5, T4, PL 2 and 4 pin, etc. and other types and forms of SSL/LED/OLED/QD lighting.

The RGBW can consist of discrete LEDs or packaged LEDs of any size and form and also could consist of additional colors and quantities such as RGBWA, RGBWB, multiple white (W) color temperatures, etc.

The present invention also includes dies of any type and form and arrangement that consist of four or more LEDs in which one of the LEDs is white—again, for example, RGBW, RGBWA (or RGBAW, etc.). The package, substrate, die, etc. that the four or more LEDs with one LED being white (e.g., RGBW) include plastic, ceramic, composite, polymers, metal, etc., combinations of these, etc. The ceramic(s) can be of any type including but not limited to oxides, nitrides, etc. such as aluminum oxide, sapphire, quartz, aluminum nitride, beryllium oxide, boron nitride, etc. Any shape can be used including essentially round, square, rectangular, elliptical, parabolic, semi-circle, semi-sphere, sphere and other standard and non-standard essentially 2 and 3 dimensional shapes and forms, etc. Two wires/pads/pins/etc. may be used per LED color or some wires/pads/pins/etc. may be reduced to reduce count, etc. for example, but not limited to, common anode or common cathode arrangements, etc.

If heat sinking is insufficient to support high power RGBW then the present invention can automatically ensure that the power is either scaled back for all channels or automatically turn off, for example, the white channel or other color channels and keep the white channel on or dim one or more channels including color and/or white channel(s). In emergency or other types of situations, such heat management control may be overridden to produce additional light (i.e., higher lumens), etc.

For any of the present inventions discussed herein, power supplies of any type, form, topology, architecture, etc. including but not limited to non-isolated and/or isolated power supplies and drivers such as buck, buck-boost, boost-buck, boost, Cuk, SEPIC, forward converters, push-pull, current mode, voltage mode, current fed, voltage fed, one-stage, two-stage, multi-stage, high power factor, linear, switching, resonant converters, half bridge, full bridge, combinations of these, etc.

Embodiments of the present invention include multi-panel configurations including parallel (i.e., same voltage, shared total current through each panel) and series (i.e., same current, stacked voltage). Currently most OLED panels, whether single or multi-color, operate at a total voltage of less than 10 VDC and are typically connected in parallel. White-changing OLED panels also provide a certain subset of color changing/tunability. The circadian rhythm lighting and/or SAD and/or light therapy products can use the white-changing/tunable OLED panels to provide blue wavelength enhanced lighting for the 'wakeup' and blue wavelength depressed lighting for the 'sleep-time' for example, by using layered blue OLEDs and yellow (or amber or orange or similar wavelength color) OLEDs, respectively in any method including layered on top of each other or side-by-side stripes/strips, etc. These respective OLEDs can be color-tuned/turned on, for example, by providing an appropriate current (or in some cases, voltage) to certain electrodes turn on and excite the proper and desired color or colors depending on the particular point and phase in the circadian rhythm cycle. Implementations of the present invention for both fixed and portable circadian rhythm applications include, but are not limited to, main lighting, under-cabinet and over cabinet lighting for bedrooms, reading rooms, living rooms, dens, family rooms, offices, barracks, hotels, hotel rooms, motel rooms, bed and breakfasts, office buildings, kitchens, bathrooms, etc., desk, table, task, reading, and portable lamps/lights, accent lamp/lights and special environment lighting and other discussed herein, etc. Some embodiments of the present invention apply multiple floating output current control to driving the respective OLEDs/LEDs/QDs/other forms of SSL, etc., combinations of these, etc.

LEDs, OLEDs, QDs, light sources and panels that are color changing, blue enhanced and blue depressed (for example, but not limited to, orange, amber, yellow, reddish, red, etc.), white changing and special purpose OLEDs can be used for circadian rhythm cycle regulation and assistance and/or SAD and/or other lighting described herein as well as for medical, cleanroom, warehouse, office space, museums, event-spaces, multi-use, multipurpose, gyms, classroom, nursery, prenatal care, urgent care, long term care, critical care, intensive care, architecture design, etc. and, general lighting, etc.

The present invention applies to OLEDs, LEDs, QDs, other types of SSLs, combinations of these, etc. in general including white and other fixed color, white-changing, color-changing and multi-color, multi-panel applications including OLEDs of any type including but not limited to stacked, layered, multi-electrode, striped, patterned, etc., OLEDs and edge emitter, edge lit, and waveguided LEDs, QDs, etc.

All of the above can be wirelessly interfaced, controlled and monitored using, for example, smart phones (i.e., iPhones, Androids), tablets (i.e., iPad, iPod touch, droid, etc.), laptops, desktops and other such digital assistants and also other dimming including 0-10 Volt dimming and powerline (PLC) dimming/control. The universal drivers can also support Triac and other forward/reverse phase cut dimming.

In some embodiments a quasi-uniform lighting panel is provided using an array of solid-state point light sources such as LED's, QD's, etc., thereby simulating a lighting panel such as an OLED. Electrical connections can be provided around edges of the panel or in any other suitable manner, providing power and control/addressing of individual point light sources or groups of point light sources. For example, LEDs of different color groups can be controlled as groups in some embodiments. The light sources can be positioned in a rectilinear array or in any suitable pattern, and can have any number of colors, RGBW, RGBWA (or RGBAW), with one or more white (W) color temperatures, etc.

An array of LEDs in an OLED equivalent array lighting panel can be included in accordance with some embodiments of the invention. LEDs can be mounted so that they are facing down onto a reflective surface, thereby producing a no-glare OLED equivalent. One or more LEDs may be positioned in each location. In some embodiments of the present invention, more than one color LED may be used. Embodiments of the present invention can provide one or more colors including, but not limited to, two colors such as blue and amber/yellow, multi-colors, RGB, 3 colors, more than 3 colors, monochrome, white, RGBA (where A is amber), RGBW (where W is white), RGBWA, RGBWA plus additional colors, etc. The LEDs can be wired in series and/or parallel and/or combinations of these. The LEDs can be at the corners, along the sides, through inserts into the reflective surface, etc.

In some embodiments the solid-state lighting is embodied in fluorescent tube replacements, such as, but not limited to, T4, T5, T6, T8, T9, T10, T12, PL 4 pin and 2 pin etc. An example embodiment of a FLR includes a single strip of LEDs mounted on a printed circuit board between end caps. One or more mounting/connection pins are provided at each end. A lens/cover/reflector etc. can be provided over one or both sides of the FLR.

Circuits can be provided on the printed circuit board, such as, but not limited to, power supply circuits, driver circuits, control circuits, monitoring circuits, reporting circuits, interface circuits, etc. In some embodiments, circuits can include sensors such as, but not limited to, temperature sensors/thermostats, cameras, thermal imaging arrays, etc. Such circuits can be located in-line with LEDs, or alongside the LEDs to avoid interrupting the array of LEDs, in end caps or at any other location.

In some other embodiments, a SSL FLR includes a double strip of LEDs mounted on a printed circuit board between end caps. One or more mounting/connection pins are provided at each end. A lens/cover/reflector etc. can be provided over one or both sides of the FLR. The printed circuit board can be mounted across the widest section of the cylindrical housing, with top and/or bottom covers/lenses/diffusers/reflectors as desired. In other embodiments, the printed circuit board can be mounted nearer the top or bottom of the cylinder, as desired. More than two (double) arrays of LEDs can be used for implementations of the present invention.

In some other embodiments, a SSL FLR includes a triple strip of LEDs mounted on a printed circuit board between end caps. One or more mounting/connection pins are provided at each end. A lens/cover/reflector etc. can be provided over one or both sides of the FLR. Again, the SSL FLR can include LEDs of one or more colors including, but not limited to, two colors such as blue and amber/yellow, multi-colors, RGB, 3 colors, more than 3 colors, monochrome, white, RGBA (where A is amber), RGBW (where W is white), RGBWA, RGBWA plus additional colors, etc. Differently colored LEDs can be arranged in any desired layout/arrangement/pattern.

The present invention is highly configurable and words such as current, set, specified, etc. when referring to, for example, the dimming level or levels, may have similar meanings and intent or may refer to different conditions, situations, etc. For example, in a simple case, the current dimming level may refer to the dimming level set by, for example, a control voltage from a digital or analog source including, but not limited to digital signals, digital to analog converters (DACs), potentiometer(s), encoders, etc.

The present invention can have embodiments and implementations that include manual, automatic, monitored, controlled operations and combinations of these operations. The present invention can have switches, knobs, variable resistors, encoders, decoders, push buttons, scrolling displays, cursors, etc. The present invention can use analog and digital circuits, a combination of analog and digital circuits, microcontrollers and/or microprocessors including, for example, DSP versions, FPGAs, CLDs, ASICs, etc. and associated components including, but not limited to, static, dynamic and/or non-volatile memory, a combination and any combinations of analog and digital, microcontrollers, microprocessors, FPGAs, CLDs, etc. Items such as the motion sensor(s), photodetector(s)/photosensor(s), microcontrollers, microprocessors, controls, displays, knobs, etc. may be internally located and integrated/incorporated into the dimmer or externally located. The switches/switching elements can consist of any type of semiconductor and/or vacuum technology including but not limited to Triacs, transistors, vacuum tubes, triodes, diodes or any type and configuration, pentodes, tetrodes, thyristors, silicon-controlled rectifiers, diodes, etc. The transistors can be of any type(s) and any material(s)—examples of which are listed below and elsewhere in this document.

The dimming level(s) can be set by any method and combinations of methods including, but not limited to, motion, photodetection/light, sound, vibration, selector/push buttons, rotary switches, potentiometers, resistors, capacitive sensors, touch screens, wired, wireless, PLC interfaces, etc. In addition, both control and monitoring of some or all aspects of the dimming, motion sensing, light detection level, sound, etc. can be performed for and with the present invention.

Other embodiments can use other types of comparators and comparator configurations, other op amp configurations and circuits, including but not limited to error amplifiers, summing amplifiers, log amplifiers, integrating amplifiers, averaging amplifiers, differentiators and differentiating amplifiers, etc. and/or other digital and analog circuits, microcontrollers, microprocessors, complex logic devices (CLDs), field programmable gate arrays (FPGAs), etc.

The dimmer for dimmable drivers may use and be configured in continuous conduction mode (CCM), critical conduction mode (CRM), discontinuous conduction mode (DCM), resonant conduction modes, etc., with any type of circuit topology including but not limited to buck, boost, buck-boost, boost-buck, Cuk, SEPIC, flyback, forward-converters, etc. The present invention works with both isolated and non-isolated designs including, but not limited to, buck, boost-buck, buck-boost, boost, Cuk, SEPIC, flyback and forward-converters including but not limited to push-pull, single and double forward converters, current mode, voltage mode, current fed, voltage fed, etc. The present invention itself may also be non-isolated or isolated, for example using a tagalong inductor or transformer winding or other isolating techniques, including, but not limited to, transformers including signal, gate, isolation, etc. transformers, optoisolators, optocouplers, etc.

The present invention may include other implementations that contain various other control circuits including, but not limited to, linear, square, square-root, power-law, sine, cosine, other trigonometric functions, logarithmic, exponential, cubic, cube root, hyperbolic, etc. in addition to error, difference, summing, integrating, differentiators, etc. type of op amps. In addition, logic, including digital and Boolean logic such as AND, NOT (inverter), OR, Exclusive OR gates, etc., complex logic devices (CLDs), field programmable gate arrays (FPGAs), microcontrollers, microprocessors, application specific integrated circuits (ASICs), etc. can also be used either alone or in combinations including analog and digital combinations for the present invention. The present invention can be incorporated into an integrated circuit, be an integrated circuit, etc. It should be noted that the various blocks shown in the drawings and discussed herein may be implemented in integrated circuits along with other functionality. Such integrated circuits may include all the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

Embodiments of the present invention may also include short circuit protection (SCP) and other forms of protection including protection against damage due to other sources of power including but not limited to AC mains power lines and/or other types of devices, circuits, etc. Some embodiments of the present invention may use, for example, but are not limited to capacitors to limit the low frequency (examples include, but are not limited to, AC line mains at 50 Hz, 60 Hz, 400 Hz) voltage and/or current that can be applied to the load. In addition to capacitors, inductors and resistors may also be used in some embodiments of the present invention.

The present invention can also incorporate at an appropriate location or locations one or more thermistors (i.e., either of a negative temperature coefficient [NTC] or a positive temperature coefficient [PTC]) to provide temperature-based load current limiting.

As an example, when the temperature rises at the selected monitoring point(s), the phase dimming of the present invention can be designed and implemented to drop, for example, by a factor of, for example, two. The output power, no matter where the circuit was originally in the dimming cycle, will also drop/decrease by some factor. Values other than a factor of two (i.e., 50%) can also be used and are easily implemented in the present invention by, for example, changing components of the example circuits described here for the present invention. As an example, a resistor change would allow and result in a different phase/power decrease than a factor of two. The present invention can be made to have a rather instant more digital-like decrease in output power or a more gradual analog-like decrease, including, for example, a linear decrease in output phase or power once, for example, the temperature or other stimulus/signal(s) trigger/activate this thermal or other signal control.

In other embodiments, other temperature sensors may be used or connected to the circuit in other locations. The present invention also supports external dimming by, for example, an external analog and/or digital signal input. One or more of the embodiments discussed above may be used in practice either combined or separately including having and supporting both 0 to 10 V and digital dimming. The present invention can also have very high power factor. The present invention can also be used to support dimming of a number of circuits, drivers, etc. including in parallel configurations. For example, more than one driver can be put together, grouped together with the present invention. Groupings can be done such that, for example, half of the dimmers are forward dimmers and half of the dimmers are reverse dimmers. Again, the present invention allows easy selection between forward and reverse dimming that can be performed manually, automatically, dynamically, algorithmically, can employ smart and intelligent dimming decisions, artificial intelligence, remote control, remote dimming, etc.

The present invention may be used in conjunction with dimming to provide thermal control or other types of control to, for example, a dimming LED driver. For example, embodiments of the present invention or variations thereof may also be adapted to provide overvoltage or overcurrent protection, short circuit protection for, for example, a dimming LED or OLED driver, etc., or to override and cut the phase and power to the dimming LED driver(s) based on any arbitrary external signal(s) and/or stimulus. The present invention can also be used for purposes and applications other than lighting—as an example, electrical heating where a heating element or elements are electrically controlled to, for example, maintain the temperature at a location at a certain value. The present invention can also include circuit breakers including solid state circuit breakers and other devices, circuits, systems, etc. that limit or trip in the event of an overload condition/situation. The present invention can also include, for example analog or digital controls including but not limited to wired (i.e., 0 to 10 V, RS 232, RS485, IEEE standards, SPI, I2C, other serial and parallel standards and interfaces, etc.), wireless including as discussed above, powerline, etc. and can be implemented in any part of the circuit for the present invention. The present invention can be used with a buck, a buck-boost, a boost-buck and/or a boost, flyback, or forward-converter design, topology, implementation, others discussed herein, etc.

A dimming voltage signal, VDIM, which represents a voltage from, for example but not limited to, a 0-10 V Dimmer can be used with the present invention; when such a VDIM signal is connected, the output as a function time or phase angle (or phase cut) will correspond to the inputted VDIM.

Other embodiments can use comparators, other op amp configurations and circuits, including but not limited to error amplifiers, summing amplifiers, log amplifiers, integrating amplifiers, averaging amplifiers, differentiators and differentiating amplifiers, etc. and/or other digital and analog circuits, microcontrollers, microprocessors, complex logic devices, field programmable gate arrays, etc.

Some embodiments include a circuit that dynamically adjusts such that the output current to a load such as a LED and/or OLED array is essentially kept constant by, for example, in some embodiments of the present invention shorting or shunting current from the ballast as needed to maintain the output current to a load such as a LED array essentially constant. Some embodiments of the present invention may use time constants to as part of the circuit.

Some embodiments include a circuit to power a protection device/switch such that the switch is on unless commanded or controlled to be set off in the event/situation/condition of a fault hazard. Such a control can be implemented in various and diverse forms and types including, but not limited to, latching, hiccup mode, etc. In some embodiments of the present invention such a circuit may have a separate rectification stage. In and for various embodiments of the present invention, the device/switch may be of any type or form or function and includes but is not limited to, semiconductor switches, vacuum tube switches, mechanical switches, relays, etc.

Some embodiments include an over-voltage protection (OVP) circuit that shunts/shorts or limits the ballast output and/or the output to the load such as a LED array in the event that the output voltage exceeds a set value.

Some embodiments include an over temperature protection (OTP) circuit that shunts/shorts or limits the ballast output and/or the output to the load such as a LED array in the event that the temperature at one or more locations exceeds a set value or set values.

Embodiments of the present invention may also include short circuit protection (SCP) and other forms of protection including protection against damage due to other sources of power including but not limited to AC mains power lines and/or other types of devices, circuits, etc. Some embodiments of the present invention may use, for example, but are not limited to capacitors to limit the low frequency (examples include, but are not limited to, AC line mains at 50 Hz, 60 Hz, 400 Hz) voltage and/or current that can be applied to the load.

Embodiments of the present invention include, but are not limited to, having a rectification stage (such as, but not limited to) consisting of a single full wave rectification stage to provide power/current to the output load such as an LED output load and a rectification stage (such as, but not limited to) consisting of a single full wave rectification stage to provide power to, for example, the hazard protection circuit.

Remote dimming can be performed using a controller implementing motion detection, recognizing motion or proximity to a detector or sensor and setting a dimming level in response to the detected motion or proximity, or with audio detection, for example detecting sounds or verbal commands to set the dimming level in response to detected sounds, volumes, or by interpreting the sounds, including voice recognition or, for example, by gesturing including hand or arm gesturing, etc. Some embodiments may be dual dimming, supporting the use of a 0-10 V dimming signal in addition to a Triac-based or other phase-cut or phase angle dimmer. Some embodiments of the present invention may multiple dimming (i.e., accept dimming information, input(s), control from two or more sources). In addition, the resulting dimming, including current or voltage dimming, can be either PWM (digital) or analog dimming or both or selectable either manually, automatically, or by other methods and ways including software, remote control of any type including, but not limited to, wired, wireless, voice, voice recognition, gesturing including hand and/or arm gesturing, pattern and motion recognition, PLC, RS232, RS422, RS485, SPI, I2C, universal serial bus (USB), Firewire 1394, DALI, DMX, etc. Voice, voice recognition, gesturing, motion, motion recognition, etc. can also be transmitted via wireless, wired and/or powerline communications or other methods, etc. In some embodiments of the present invention speakers, earphones, microphones, etc. may be used with voice, voice recognition, sound, etc. and other methods, ways, approaches, algorithms, etc. discussed herein.

The present invention includes implementations that contain various other control circuits including, but not limited to, linear, square, square-root, power-law, sine, cosine, other trigonometric functions, logarithmic, exponential, cubic, cube root, hyperbolic, etc. in addition to error, difference, summing, integrating, differentiators, etc. type of op amps. In addition, logic, including digital and Boolean logic such as AND, NOT (inverter), OR, Exclusive OR gates, etc., complex logic devices (CLDs), field programmable gate arrays (FPGAs), microcontrollers, microprocessors, application specific integrated circuits (ASICs), etc. can also be used either alone or in combinations including analog and digital combinations for the present invention. The present invention can be incorporated into an integrated circuit, be an integrated circuit, etc.

The present invention, although described primarily for motion and light/photodetection control, can and may also use other types of stimuli, input, detection, feedback, response, etc. including but not limited to sound, vibration, frequencies above and below the typical human hearing range, temperature, humidity, pressure, light including below the visible (i.e., infrared, IR) and above the visible (i.e., ultraviolet, UV), radio frequency signals, combinations of these, etc. For example, the motion sensor may be replaced or augmented with a sound sensor (including broad, narrow, notch, tuned, tank, etc. frequency response sound sensors) and the light sensor could consist of one or more of the following: visible, IR, UV, etc. sensors. In addition, the light sensor(s)/detector(s) can also be replaced or augmented by thermal detector(s)/sensor(s), etc.

The example embodiments disclosed herein illustrate certain features of the present invention and not limiting in any way, form or function of present invention. The present invention is, likewise, not limited in materials choices including semiconductor materials such as, but not limited to, silicon (Si), silicon carbide (SiC), silicon on insulator (SOI), other silicon combination and alloys such as silicon germanium (SiGe), etc., diamond, graphene, gallium nitride (GaN) and GaN-based materials, gallium arsenide (GaAs) and GaAs-based materials, etc. The present invention can include any type of switching elements including, but not limited to, field effect transistors (FETs) of any type such as metal oxide semiconductor field effect transistors (MOSFETs) including either p-channel or n-channel MOSFETs of any type, junction field effect transistors (JFETs) of any type, metal emitter semiconductor field effect transistors, etc. again, either p-channel or n-channel or both, bipolar junction transistors (BJTs) again, either NPN or PNP or both, heterojunction bipolar transistors (HBTs) of any type, high electron mobility transistors (HEMTs) of any type, unijunction transistors of any type, modulation doped field effect transistors (MODFETs) of any type, etc., again, in general, n-channel or p-channel or both, vacuum tubes including diodes, triodes, tetrodes, pentodes, etc. and any other type of switch, etc.

The examples shown above are intended to provide non-limiting examples of the present invention and represent only a very small sampling of the possible ways, topologies, connections, arrangements, applications, etc. of the present invention. Based upon the disclosure provided herein, one of skill of the art will recognize a number of combinations and applications of solid-state lighting system elements disclosed herein that can be used in accordance with various embodiments of the invention without departing from the inventive concepts.

It should be noted that the various blocks discussed in the above application may be implemented in integrated circuits along with other functionality. Such integrated circuits may include all the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some cases, parts of a given system, block or circuit may be implemented in software or firmware, while other parts are implemented in hardware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components. For example, op amp and comparator in most cases may be used in place of one another in this document.

While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

In some embodiments of the present invention, one or more time constants may be used to provide feedback and control. In some implementations of the present invention it may be useful to turn off or turn on one or more time constants or other feedback or control circuits when in the ballast powered mode of operation compared to the AC mode of operation.

Implementations of the present invention can be used to identify solid state fluorescent lamp replacements in a solid-state lighting system, powered by one or more of multiple sources in accordance with some embodiments of the invention. Some embodiments of the invention include Identification Switches with, for example but not limited to, RFID and/or NFC. In addition implementations of the present invention could have mechanical to electrical switch and/or gesturing, etc. that could, for example, but not limited to ZigBee to RFID, BTLE to RFID, etc. Control circuits interface with the present inventions including indirect and/or direct SSL, SSL FLRs, powered by any source, including but not limited to, power from the AC line, power from one or more batteries, one or more solar cells of any type or form including to, but not limited to, inorganic, semiconductor, organic, quantum dot, etc., battery charger, vibration energy converter, RF converter, energy harvester of any type and source, etc., power of Ethernet, DC power sources, AC to DC conversion, etc., combinations of these, etc. The switch or actuator can be of any type including toggle, momentary, mechanical to electrical switch and/or gesturing, touch, capacitive sensing, etc. that could, for example, but not limited to also use ZigBee to RFID, BTLE to RFID, etc. WiFi to RFID, and vice-versa, etc., two-way communications, etc., combinations of these, etc. Embodiments of the present invention can also be powered by low voltage output power sources including with power over Ethernet (POE). Power switching and/or dimming can be of any known type including but not limited to electro-mechanical, reed, latching, other electrical and/or mechanical, solid state, etc., relay(s), Triac, silicon-controlled rectifier (SCR), transistor, etc., more than one of one, more than one of each, combinations of one, combinations of each, other combinations, etc.

Some embodiments of the invention include circuits to link to watches and in particular smart watches, wearable watches, health monitoring watches, FitBit, Apple. Nike, Android based smart watches and wearables, etc.

Some embodiments of the invention include circuits to link to watches and/or other types of wearables to interact with, control, dim, monitor, light and other systems.

Some embodiments of the invention include motion detectors for outdoor outside that can have motion sensor, ultrasonics, noise, etc. separate from the light source and connected via Bluetooth Smart, BLE, USB, use WEB and other info including but not limited to weather, wind, wind speed, could coordinate with other sensors, lights, etc. feedback information, etc.

Some embodiments of the invention include lamps that can be all or partially screen printed, 3D printed, etc. including custom designs, customized designs, etc. using, for example, UL or CE approved, recognized, listed, etc. materials.

Some embodiments of the invention use proximity sensors and/or beacons, identifiers, etc. to identify who is near including by cellular/smart phone, smart watch, other Bluetooth devices, RFID, others, etc. and take appropriate actions including settings selection based on profile information stored, learned, taught, trained, memorized, etc., combinations of these, etc.

Some embodiments of the invention advertise and obtain Bluetooth and other ID, etc.

Some embodiments of the invention use display panels including but not limited to OLED panels, tablets, etc. as lighting panels.

Some embodiments of the invention use a synchronous bridge for the dimmer. Some embodiments of the invention can also have a TRIAC that is, for example, but not limited to being in parallel with the diodes and transistors of embodiments of the present invention.

Some embodiments of the invention include motion sensing for either outdoor or indoor that can wirelessly, wired and/or powerline communications set, program, control, monitor, log, respond, alert, alarm, etc. including being able to be part of a cluster, group, community of lights, etc., that provides, for example, but not limited to, protection and security, etc., can, for example, but not limited to, detect a defective light, light (burned) out, can provide dimming, can use one or more colors of white, RGB, etc., can dim up and dim down, etc., can control, set, program, sequence, synchronize, etc. all parameters including but not limited to distance, length of time on, sensitivity, ambient light level, response, synchronizing with outdoor and indoor motion sensors, response including but not limited to white color temperature and/or color choice(s), flashing or solid on, flashing, sequences of flashing, sequences of flashing and solid on, etc. of one or more colors including but not limited to one or more white colors, one or more white colors with one or more other colors, one or more colors, Some embodiments of the invention include sensors in the light(s), sensors attached to and/or near the light(s), sensors remote from the lights including battery powered, AC powered, solar powered, energy harvested, battery charged, etc., combinations of these, etc., including, for example, but not limited to, solar power battery charging.

Some embodiments of the invention are adapted for use in stairwells, etc. especially ones that have doors to entry, use a device that makes a sound when the door is opened so that the light source 'hears' the sound and turns on. Can use any device, approach, method, etc. that can convey that the door is opened or someone has passed through the door including, for example, but not limited to, photoelectric beam and photoelectric eye, magnetic proximity switch, other types of detection of open door, etc., can use two tone or more tone frequency, etc.

Some embodiments of the invention can use active or passive or both high pass, low pass, bandpass, notch, other filters, combinations, etc. including with the voice, sound, noise detection.

Some embodiments of the invention can use isolated digital PWM that can be converted to analog near the control reference point.

Some embodiments of the invention can use proximity and/or signal strength to decide, for example, but not limited to turn on or off lights, etc.

Some embodiments of the invention can flash at the end of an allotted time to indicate that the next group is ready to use, for example, a conference room.

Some embodiments of the invention can listen for and respond to emergency sounds such as smoke, fire, carbon monoxide (CO), carbon dioxide (for, for example but not limited to, both health and occupancy information), etc. detectors, sensors, etc. by flashing, turning on, forwarding the information, alert, alarm, etc.

Some embodiments of the invention can be powered over Ethernet (POE), dimmed, controlled, monitored, logged, have bi-directional communications, data mining, analytics, etc. Can be powered, controlled, monitored, managed, etc. via wired or wireless or powerline control (PLC) including but not limited to serial communications, parallel communications, RS232, RS485, RS422, RS423, SPI, I2C, UART, Ethernet, ZigBee, ZWave, Bluetooth, BTLE, WiFi, LiFi, cellular, mobile, ISM, Wink, powerline, etc., combinations of these, etc.

A solid state lighting system is depicted with color controllable multiple light sources in accordance with some embodiments of the invention. For example, a solid-state lighting system may include a solid-state light fixture with multiple flat lighting panels (e.g., OLED panels) and multiple solid state point light sources, such as a LED. The shape, layout, form factor, and types and numbers of light sources are merely examples and should not be viewed as limiting in any manner. Embodiments of the present invention can also have lighting on the outside of, for example, the light bar, panel, etc. including direct lit, edge lit, back lit, etc. Some example embodiments are shown below which can also include one or multiple LEDs, OLEDs, QDs that can consist of one or more of white, red, green, blue, amber, yellow, orange, etc. In addition, such lighting can be used to convey information about the status of a situation including flashing lights which may convey emergency situations, etc. In some embodiments, the SSL can provide evening/night light using for example amber-orange-yellow SSLs including but not limited to LEDs and/or OLEDs that can be dimmed, flashed, color-changing, sound alarms, sequence, provide time of day and circadian rhythm and/or other health therapy or ailment alignment, information, etc. Some embodiments of the present invention can have light, motion, proximity, noise, sound RFID, NFC, etc. sensors that are either internal or external and connected by one or more of wired, wireless, powerline communications (PLC), etc.

Some embodiments of the present invention can include LEDs. OLEDs, QDs, other SSLs, other types of lights, etc. combinations of these, etc. and can include combinations of flashing, sequencing, dimming, changing colors, individually and/or collectively, etc., sirens, alarms, alerts, web connectivity, wired, wireless and/or PLC, etc.

Power supply circuits can pass power through to solid state lights and can provide one or more of the functions disclosed herein, such as, but not limited to, current control, undervoltage protection (UVP), overvoltage protection (OVP), short circuit protection (SCP), over-temperature protection (OTP), etc. Dimming control signals, either or both wired and wireless, can be used to control the power supply circuits, including, for example, using isolated dimming inputs (e.g., 0 to 10 V, 0 to 3 V, digital, including wired and wireless including but not limited to those mentioned, discussed, listed, etc. herein, combinations of these, etc.) Other embodiments of the present invention can also monitor, log, store, access the web, the cloud, communicate with the Ethernet, mobile cellular carriers, etc., combinations of these, etc.

Some embodiments of the invention can include indoor and/or outdoor motion sensors. The lights and, for example, sensors can have auxiliary ports that allow both control signals and other types of sensors, detectors, features, functions, etc. including, for example, but not limited to, motion, sound, video, vision recognition, pattern recognition, etc., combinations of these, etc. The indoor and outdoor embodiments can be very similar except for weather-proof for outdoor uses. Embodiments of the present invention can use existing lighting fixtures, including those with or without motion sensing and make them motion sensing capable including having the motion sensing inside the light source or as an extension to the light source that can be plugged into the light source and control the turning on/off and dimming up/down of the light source(s), etc., other sensors, alarms, alerts, communications, etc. can be added to embodiments of the present invention as well as being capable of being compatible with existing/legacy lighting including, for example, but not limited to motion detection, security, photoelectric cell/dusk to dawn lighting, etc., combinations of these, etc., including for example but not limited to, detecting when a conventional, non-communicating motion detector light fixture turns on and wirelessly or wire (or, in some cases, PLC) reporting, communicating, logging, tracking, etc. such information, etc. Embodiments of the present invention can also completely set all parameters of the present invention including but not limited to, the light level, detection threshold, detection level, distance, proximity, etc., notify under what conditions, notify neighbors, etc., light level to turn on at, whether to flash or not, etc., detection, sniffing, identification, etc. of smart devices including but not limited to smart phones, cellular phones, tablets, smart watches, wrist watches, fitness, well-being watches, other wearables, PDAs, mobile devices, RFID, wearables, sounds, noise, voice(s), one or more certain frequencies, other types of technologies that can be used in tandem, conjunction with the present invention, other signatures, signs, identification, etc., combinations of these. Embodiments of the present invention can use such information to decide or aid in deciding whether the detection is due to, for example, but not limited to, a friend or foe and an unidentified source or object, person, animal, wind, etc. Embodiments of the present invention can record, store, analyze, keep track of, for example, the frequency of such occurrences and incidents, including any new digital, electronic, or other information including unique information about the device or person, etc. such as cellular phone identifiers, RF/wireless IDs, names, user names, etc. In addition, embodiments and implementations of the present invention can use optical or other methods to act as an intruder alert system such that, for example, but not limited to, an optical beam that connects two or more of the present invention including, examples where the two or more embodiments of the present invention have direct line of sight to each other and effectively have a beam of light in between that is broken or disrupted, etc. Such a beam of light can be modulated with the user able to select one or more from a variety of modulations so as to make it more difficult to emulate the beam, etc. Such beam modulations and detection can be two or more way so as to add to the reliability and security, etc.

Some embodiments of the invention can be configured, controlled, monitored, etc., from/to smart devices using for example, but not limited to, apps, laptops, desktops, servers, mobile and/or PDA devices of any type or form, combinations of these, etc.

Some embodiments of the invention can include motion sensors performing multiple duties—turning on/off lights, alerting that there are people there, heating or cooling spaces, burglar alarm, camera, image recognition, noise, voice, recognition, sound recognition, etc. accessories, thermal imagers, night vision, infrared cameras, infrared lit cameras, etc.

In some embodiments of the present invention, a small PWM pulse width can be the default pulse width such that the amount of power/current at the highest input voltage will limit the power applied without a signal to increase the pulse. This will allow a current/power limit in the event of, for example, a short circuit on the output since a small pulse to big pulse is needed for higher power in AC line voltage mode. The pulse width can be made larger by a circuit that measures the pulse width and allows the pulse width to increase until the desired current level is attained.

Some embodiments of the invention can include outdoor motion sensing with smart additional components, accessories, etc. Sense/sensing includes weather, including from any source such as a local weather station, personal weather station, web-based weather report, etc. Smart Motion sense can also dim, flash, change intensities, white colors, be color-changing, etc., communicate two or more way, etc., monitor weather locally, regionally, wind factor, have a wind indicator, etc., wind vane, wind generator, etc.

Implementations of the present invention are designed to be a cost-effective and complete solution that provides both forward and backward compatibility which is also ideal for retrofits and can use either wireless or wire (or both) communications.

Implementations of the present invention include comprehensive sensing and monitoring. Implementations of the present invention can be Web-based and/or WiFi-based (or other) and interface with smart phones, tablets, other mobile devices, laptops, computers, dedicated remote units, etc. and can support a number of wireless communications including, but not limited to, IEEE 802, ZigBee, Bluetooth, ISM, etc.

Implementations of the present invention can include, but not limited to, dimmers, drivers, power supplies of all types, switches, motion sensors, light sensors, temperature sensors, daylight harvesting, other sensors, thermostats and more and can include monitoring, logging, analytics, etc.

Embodiments of the present invention support and can include color changing, color tuning, etc. lights with numerous ways to interact with the lights.

Embodiments of the present invention can be integrated with video, burglar, fire alarm, etc. components, systems.

Other features and functions include but are not limited to detecting the frequency using a microprocessor, microcontroller, FPGA, DSP, etc. Use a switch including, for example, a transistor such as a field effect transistor (FET) such as a MOSFET or JFET to, for example, either turn on or turn off a circuit that operates in either ballast mode or AC line mode depending on the amplitude of the signal or with the inclusion of a time constant, the average, RMS, etc. voltage level. Embodiments of the present invention removes the requirement that a reference level and a comparison to the reference level is required to detect the amplitude of the waveform The present invention can also have sirens, microphones, speakers, earphones, headphones, emergency lights, flashing lights, fans, heaters, sensors including, but not limited to, temperature sensors, humidity sensors, moisture sensors, noise sensors, light sensors, spectra sensors, infrared sensors, ultraviolet sensors, speech sensors, voice sensors, motion sensors, acoustic sensors, ultrasound sensors, RF sensors, proximity sensors, sonar sensors, radar sensors, etc., combinations of these, etc.

The present invention can also provide two or more side (multi-side) lighting for example, for an AC powered, DC powered, ballast powered FLR, alternative energy, energy harvesting, etc. combinations of these, etc. SSLs where one side contains SSL that, for example, consists of white color or white colors of one or more color temperatures and another side contains SSL or other lighting of one or more wavelengths such as red, green, blue, amber, white, yellow, etc., combinations of these, subsets of these, etc. The two or more sided lighting can perform different functions—for example, the side that is primarily white or all white light of one or more color temperatures can provide primary lighting whereas the side that has one or more color/wavelengths of light can provide indication of location, status, code level in, for example, a hospital (i.e., code red, code blue, code yellow, etc.), accent lighting, mood lighting, location indication, emergency information and direction, full spectrum lighting, etc.

The present invention can work with all types of communications devices including portable communications devices worn by individuals, walkie-talkie types of devices, etc.

The present device can use combinations of wireless and wired interfaces to control and monitor; for example for a linear or other fluorescent replacement for, for example, but not limited to, T4, T5, T8, T9, T10, T12, etc., one (or more) of the replacement lamps can be wireless with wired connections from the one (or more) replacement lamp(s) to the other replacement lamps such that the one or more wireless replacement lamps acts as a master receiving and/or transmitting information, data, commands, etc. wirelessly and passing along or receiving information, data, commands, etc. from the other remaining wired slaved units. In other embodiments one or more wired masters/leaders may transfer, transmit, or receive, etc. information, data, commands from other wireless and/or wired equipped fluorescent lamp replacements, etc. of combinations of these.

The present invention can also have one or more thermometers, thermostats, temperature controllers, temperature monitors, etc., combinations of these, etc. that can be wirelessly or wired interfaced controlled, monitored, etc. Such one or more thermometers, thermostats, temperature controllers, temperature monitors, etc., combinations of these, etc. can be connected/interfaced, for example, but not limited to, by Bluetooth, Bluetooth low energy, WiFi, LiFi, IEEE 801, IEEE 802, ZigBee, ZWave, LiFi, other 2.4 GHz and related/associated standards, protocols, interfaces, ISM, other frequencies including but not limited to, radio frequencies (RF), microwave frequencies, millimeter-wave frequencies, sub millimeter-wave frequencies, terahertz (THz), mobile cellular network connections, combinations of these. Wired connections, interfaces, protocols, etc. include but are not limited to, serial, parallel, UART, SPI, I2C, RS232, RS485, RS422, other RS standards and serial standards, interfaces, protocols, etc. powerline communications, interfaces, protocols, etc. including both ones that work on DC and/or AC, DMX, DALI, 0 to 10 Volt, other voltage ranges including but not limited to 0 to 3 Volt, 0 to 5 Volt, 1 to 8 Volt, etc.

In some embodiments of the present invention, the thermometer(s) and/or thermostats may be remotely located. In other embodiments of the present invention, such a temperature sensor or sensors or thermostat or thermostats can use wireless or wired units, interfaces. protocols, device, circuits, systems, etc. In some embodiments the thermometer(s) and/or thermostat(s) can communicate with each other and relay, share, and pass commands as well as provide information and data to one another.

In addition, embodiments of the present invention can use switches that are remotely controlled and monitored to detect the use of power or the absence of power usage, to open or close garage or other doors by locally and/or remotely sending signals to garage door openers including acting as a switch to complete detection circuits, remembering the status of garage door opening or closing, working with other motion sensors, photosensors, etc. horizontal/vertical detectors, inclinometers, etc., combinations of these, etc. Embodiments of the present invention can both control and monitor the status of the garage or other door and sound alarms, send alerts, flash lights including flashing white lights and/or one or more color/wavelength lights, turn on lights, turn off lights, activate cameras, record video, images, sounds, voices, respond to sounds, noise, movement, include and use microphones, speakers, earphones, headphones, cellular communications, etc., other communications, combinations of these, etc. Such embodiments and implementations can use Bluetooth, Bluetooth low energy, WiFi, LiFi, IEEE 801, IEEE 802, ZigBee, ZWave, other 2.4 GHz and related/associated standards, protocols, interfaces, ISM, other frequencies including but not limited to, radio frequencies (RF), microwave frequencies, millimeter-wave frequencies, sub millimeter-wave frequencies, terahertz (THz), mobile cellular network connections, combinations of these. Wired connections, interfaces, protocols, etc. include but are not limited to, serial, parallel, SPI, I2C, RS232, RS485, RS422, other RS standards and serial standards, interfaces, protocols, etc. powerline communications, interfaces, protocols, etc. including both ones that work on DC and/or AC, DMX, DALI, 0 to 10 Volt, other voltage ranges including but not limited to 0 to 3 Volt, 0 to 5 Volt, 1 to 8 Volt, etc., relays, switches, transistors of any type and number, etc., combinations of these, etc.

The present invention also allows various types of radio frequency (RF) devices such as, but not limited to, window shades, drapes, diffusers, garage door openers, cable boxes, satellite boxes, etc. to be controlled and monitored by replacing and integrating these functions into implementations of the present invention including being able to synthesize and reproduce the RF signals which are typically in the range of less than 1 kHz to greater than 5 GHz using one or more RF synthesizers including ones based on phase lock loops and other such frequency tunable and adjustable circuits with may also employ frequency multiplication, amplification, modulation, etc., combinations of these, etc., amplitude modulation, phase modulation, pulses, pulse trains, combinations of these, etc.

A global positioning system (GPS) can be included in the present invention to track the location and, for example, to also make decisions as to where and when the present invention should do certain things including but not limited to turning on or off, dimming, turn on heat or cooling, control and monitor the lighting, etc., control, water, monitor the lawn and other plants, trees etc.

Embodiments of the present invention can use/incorporate/include/etc. thermal imagers including but not limited to IR imagers, IR imaging arrays, non-contact temperature measurements including point temperature and array temperature measurements including in lighting such as T8 replacements where the imagers are powered, for example, but not limited to the ballast.

Embodiments of the present invention allow for dimming with both ballasts and AC line voltage.

Implementations of the present invention can use, but are not limited to, Bluetooth, Bluetooth low energy, WiFi, LiFi, IEEE 801, IEEE 802, ZigBee, ZWave, other 2.4 GHz and related/associated standards, protocols, interfaces, ISM, other frequencies including but not limited to, radio frequencies (RF), microwave frequencies, millimeter-wave frequencies, sub millimeter-wave frequencies, terahertz (THz), mobile cellular network connections, combinations of these. Wired connections, interfaces, protocols, etc. include but are not limited to, serial, parallel, SPI, I2C, RS232, RS485, RS422, other RS standards and serial standards, interfaces, protocols, etc. powerline communications, interfaces, protocols, etc. including both ones that work on DC and/or AC, DMX, DALI, 0 to 10 Volt, other voltage ranges including but not limited to 0 to 3 Volt, 0 to 5 Volt, 1 to 8 Volt, etc.

Embodiments of the present invention include SSL/LED Direct Fluorescent Tube Lamp Replacements that can be used, for example, but not limited to, for daylight harvesting/occupancy uses and applications.

Embodiments of the present invention uses wireless signals to both control (i.e., dim) the present inventions including but not limited to all types and forms of indirect, direct indirect and direct SSL including OLED+LED and SSL/LED fluorescent lamp replacements (FLRs) and monitor the LED current, voltage and power. The present invention includes but is not limited to fluorescent lamp replacements that work directly with existing electronic ballasts and requires no re-wiring and can be installed in the same amount of time or less than changing a regular fluorescent lamp tube. These smart/intelligent SSL/LED FLRs are compatible with most daylight harvesting controls and protocols. Optional sensors allow for relative light output to be measured and wirelessly reported, monitored, and logged permitting analytics to be performed. Embodiments of the present invention come in a diversity of lengths including but are not limited to two foot and four foot T8 standard/nominal linear lengths as well as T12. Additional optional input power measurements allow total power usage, power factor, input current, input voltage, input real and apparent power to also be measured thus allowing efficiency to be measured. The wireless signals can be radio signals in the industrial, scientific and medical (ISM) for lower cost and simplicity or ZigBee, ZWave, IEEE 802, or WiFi or Bluetooth or any type of form. In addition to occupancy/motion sensors, photo sensors and daylight harvesting controls, simple and low cost interfaces that allow existing other brands, makes, and models of daylight harvesting controls, photo sensors, occupancy/vacancy/etc. motion sensors to be connected to and control/dim embodiments of the wireless indirect, direct and/or indirect/direct SSL and SSL/LED FLRs. The SSL FLR can be switched on and off millions of times without damage as well as be dimmed up and down without damage. The wireless communications can be encrypted and secure. Such embodiments of the present invention FLRs do not require or need a dimmable ballast and work with virtually any T8 electronic ballast from all major ballast manufacturers (optionally with most T12 electronic ballasts).

The present invention can have integrated motion sensor as part of the housing and can also use auxiliary motion sensors and can also have integrated light/photocell sensor as well as auxiliary.

The present invention can also respond to proximity sensors including passive or active or both, as well as voice commands and can be used to turn on, turn off, dim, flash or change colors including doing so in response to an emergency situation. The present invention can use wireless, wired, powerline, combinations of these, etc., Bluetooth, RFID, WiFi, LiFi, ZigBee, ZWave, IEEE 801, IEEE 802, ISM, etc. In addition, the present invention can be connected to fire alarms, fire alarm monitoring equipment, etc.

Embodiments of the present invention permits enhanced circadian rhythm alignment and maintenance using sources of light. Such sources of light include, but are not limited to, computer screens, monitors, panels, etc., tablet screens, smart phone screens, etc., televisions (TVs), LCD and CRT displays of any type or form, DVD and other entertainment lighting and displays containing LEDs, OLEDs, CCFLs, FLs, CRTs, etc., displays, monitors, TVs, OLED, LED, CCFL, FL, incandescent lighting, etc.

The present invention can use smart phones, tablets, computers, dedicated remote controls, to provide lighting appropriate for circadian rhythm alignment, correction, support, maintenance, etc. that can be, for example, coordinated wake-up and sleep times whether on a 'natural' or shifted (i.e., night workers, shift workers, etc.) to set and align their sleep patterns and circadian rhythm to appropriates phases including time shifts and time zone shifts due to work and other related matters.

The present invention can use external and internal information gathered from a number of sources including clocks, internal and external lighting, time of the year, individual, specific input, physiological signals, movements, monitoring of physiological signals, stimuli, including but not limited to, EEG, melatonin levels, urine, wearable device information, sleep information, temperature, body temperature, weather conditions, etc., combinations of these, etc.

The present invention can use TVs essentially of any type or form, including, but not limited to smart TVs, and related and similar items, products and technologies including, but not limited to, computer and other monitors and displays that can either be remotely or manually controlled and, in some embodiments, monitored. The present invention can use smart phones, tablets, PCs, remote controls including programmable remote controls, consoles, etc., combinations of these etc., to control and set the content of the lighting (e.g., white or blue-enriched, etc. combinations of these, etc. for wake-up; yellow, amber, orange, red, etc., combinations of these, etc. for sleep-time, etc.) automatically to assist in circadian rhythm, sleep, SAD mitigation, reduction, elimination, etc. In some embodiments of the present invention, music, sounds, white noise, sea shore sounds, sound effects, narratives, live audio, inspirational audio including previously recorded, generated, synthesized, etc., soothing sounds, familiar sounds and voices, etc. and combinations of these to go to sleep with. Jarring, buzzing, alarming, beeping, interrupting sounds, alarm clock sounds and noises, sleep disruptive sounds, noises and/or voices, etc. accompanied by white light, blue color/wavelength light including, but not limited to, slowing dimming up to a preset, optimum, and/or maximum brightness or setting, etc. for wake-up in the morning. Embodiments of the present invention can provide multiple wake-ups to the same location and/or different locations including other locations in homes, houses, hotels, hospitals, dormitories including school and military and other types of barracks, dormitories, etc., assisted living homes and facilities, chronic care facilities, rehabilitation facilities, etc., children's hospitals and care facilities, etc. group living, elder living, etc., children's rooms and other family members whether in the same physical location or in different physical locations, friends and family, clients, guests, travelers, jet lagged and sleep deprived people and personnel, etc.

The present invention can have integrated motion sensor as part of the housing and can also use auxiliary motion sensors and can also have integrated light/photocell sensor as well as auxiliary. In some embodiments of the present invention, these can be stand-alone units that replace conventional fluorescent lamps including, but not limited to, T8, T12, T5, T10, T9, U-shaped, CFLs, etc. of any length, size and power as well as high intensity discharge lamps of any size, type, power, etc.

The present invention can also respond to proximity sensors including passive or active or both, as well as voice commands and can be used to turn on, turn off, dim, flash or change colors including doing so in response to an emergency situation. The present invention can use wireless, wired, powerline, combinations of these, etc., Bluetooth, RFID, WiFi, ZigBee, ZWave, IEEE 801, IEEE 802, ISM, etc. In addition the present invention can be connected to fire alarms, fire alarm monitoring equipment, etc.

The present invention can use a BACNET to wireless converter box or BACNET to Bluetooth including Bluetooth low energy (BLE) converter. The present invention can also use infrared signals to control and dim the lighting and other systems as well as other types of devices including but not limited to heating and cooling, thermostats, on/off switches, other types of switches, etc.

The present invention can have the motion proximity sensor send signals back to the controller/monitor or other devices including but not limited to cell phones, smart phones, tablets, computers, laptops, servers, remote controls, etc. when motion or proximity is detected etc. Embodiments of the present invention can have on/off switches for the ballasts where the ballasts connect to the AC lines and/or also where the ballasts connect to the present invention, etc.

Embodiments and implementations of the present invention allow for optional add-ons including but not limited to wired, wireless or powerline control which, for example, could be installed or added later and interfaced to the present invention as well as allowing sensors such as daylight harvesting/photo/light/solar/etc. sensors as well as motion/PIR/proximity/other types of motion, distance, proximity, location, etc., sensors, detectors, technologies, etc., combinations of these, etc. to be used with the present invention.

The present invention provides a means to improve circadian rhythm by providing the appropriate wavelengths of light at appropriate times.

Internal and external photosensors including wavelength specific or the ability to gather entire or partial spectrum, etc. and can use atomic clock(s) signals, other broadcast time signals, cellular phone, time, smart phone, tablet, computers, personal digital assistants, etc., remote control via dedicated units, smart phones, computers, laptops, tablets, etc.

The present invention can also have sirens, microphones, speakers, earphones, headphones, emergency lights, flashing lights, fans, heaters, sensors including, but not limited to, temperature sensors, humidity sensors, moisture sensors, noise sensors, light sensors, spectra sensors, infrared sensors, ultraviolet sensors, speech sensors, voice sensors, motion sensors, acoustic sensors, ultrasound sensors, RF sensors, proximity sensors, sonar sensors, radar sensors, etc., combinations of these, etc. The sound and/or noise sensors as well as other sensors, etc. can use one or more filters including one or more low pass, high pass, notch, bandpass including narrow bandpass filters, etc. Such filters can be realized by either or both analog and digital means, approaches, ways, functions, circuits, etc., combinations of these, etc. Such filter functions can be active or passive or both, can be manually and/or automatically set and adjustable, can be set, adjusted, programmed, etc. by an app, by other types and forms of software and hardware, by smart phone(s), tablet(s), laptops, servers, computers, other types of personal digital assistant(s), etc.

Embodiments of the present invention can have more than one wavelength or color of LEDs and/or SSLs and can include more than one array of LEDs, OLEDs, QDs, etc. that permit color selection, color blending, color tuning, color adjustment, etc. Embodiments of the present invention can include multiple arrays that can be switched on or off or in or out and/or dimmed with either power being supplied by a ballast or the AC line that can be remotely selected, controlled and monitored. Examples of the present invention include different wavelengths, combinations of colors and phosphors, etc. are used to obtain desired performance, effects, operation, use, etc. Embodiments can include one, two, three or more arrays of SSLs, including, but not limited to, side-by-side, 180 degrees from each other, on opposite sides, on multiple sides for example hexagon or octagon, etc. The SSLs including but not limited to LEDs, OLEDs, QDs, etc. may be put in series, parallel or combinations of series and parallel, parallel and series, etc. In other embodiments of the present invention, phosphors, quantum dots, and other types of light absorbing/changing materials that for example can effectively change wavelengths, colors, etc. for example by applying a voltage bias or electric field. The present invention can also take the form of linear fluorescent lamps from less than 1 foot to more than 8 feet in length and may typically be T4, T5, T8, T9, T10, T12, etc. Such embodiments of the present invention may use an insulating housing made from, for example but not limited to, glass or an appropriate type of plastic, which may or may not have a diffuser or be a diffuser in terms of the plastic. In some embodiments of the present invention plastic housings may be used that can include diffusers on the entire surface, diffusers on half the surface, diffusers on less than half the surface, diffusers on more than half of the surface, with the rest of the surface either being clear plastic, opaque plastic or a metal such as aluminum or an aluminum alloy.

Photon/wavelength conversion including down conversion can be used with the present invention including being able to adjust the photon/wavelength conversion electrically. Spectral/spectrum sensors can be used to detect the light spectral content and adjust the light spectrum by turning on or off certain wavelengths/colors of SSL. The spectral sensors could consist of color/wavelength sensitive detectors covering a range of colors/wavelengths of filters that only each only permit a certain, typically relatively narrow, range of wavelengths to be detected. As an example, red, orange, amber, yellow, green, blue, etc. color detectors could be included as part of the spectral/spectrum sensor or sensors. In some embodiments of the present invention, quantum dots can be used as part of and to implement the spectral/spectrum sensors.

Implementations of the present invention can include and consist of any number and arrangement of smart dimmers (by wired, wireless, powerline communications, etc. combinations of these, etc.) including ones that connect directly to the AC power lines that can control, but are not limited to, one or more of, for example, but not limited to, as an example, FLRs, A-lamps, PAR 30, PAR 38, PLC lamps, R20, R30, dimmable compact florescent lamps, incandescent bulbs, halogen bulbs, other types of direct, indirect and/or direct/indirect SSL etc. as well as smart dimmable (i.e., by wired, wireless, powerline communications, etc., combinations of these, etc.), infrared controlled devices including heaters of any type or form, air conditioners of any type or form, color-changing, color-tunable, white color-changing, lighting of any type including but not limited to those discussed herein. Non-dimmable lamps and appliances and entertainment device can also be included in such implementations of the present invention and may be turned on and off by one or more of the smart on/off switches or a dimmer that is, for example, but not limited to, programmed to full on and full off only, etc. Such implementations of the present invention can also use one or more or all of the sensors, detectors, processes, approaches, etc. discussed herein and well as any other type or types of sensors, detectors, controls, etc. The smart lighting, dimmers, power supplies, sensors, controls, etc. can you any type or types of wired, wireless, and/or powerline communications. Any practical number of dimmers, lights, lighting, sensors, detectors, controls, monitoring, logging, analytics, heaters, air conditioners, fire, safety, burglar alarm(s), burglar protection, etc., appliances, entertainment devices, home safety, personal safety, thermometer(s), thermostat(s), humidifier(s), etc.

The present invention may use any type of circuit, integrated circuit (IC), microchip(s), microcontroller, microprocessor, digital signal processor (DSP), application specific IC (ASIC), field gate programmable array (FPGA), complex logic device (CLD), analog and/or digital circuit, system, component(s), filters, etc. including, but not limited to, any method to provide a switched signal such as a PWM drive signal to the switching devices. In addition, additional voltage and/or current detect circuits may be used in place of or to augment the control and feedback circuits.

Some embodiments of the present invention can accept the output of a fluorescent ballast replacement that is designed and intended for a LED Fluorescent Lamp Replacement that is remote dimmable and can also be Triac, Triac-based, forward and reverse dimmer dimmable and incorporates all of the discussion above for the example embodiments. The remote fluorescent lamp replacement ballast can use or receive control signals/commands from, for example, but not limited to any or all of wired, wireless, optical, acoustic, voice, voice recognition, motion, light, sonar, gesturing, sound, ultrasound, ultrasonic, mechanical, vibrational, and/or PLC, etc., combinations of these, etc. remote control, monitoring and dimming, motion detection/proximity detection/gesture detection, etc. In some embodiments, dimming or/other control can be performed using methods/techniques/approaches/algorithms/etc. that implement one or more of the following: motion detection, recognizing motion or proximity to a detector or sensor and setting a dimming level or control response/level in response to the detected motion or proximity, or with audio detection, for example detecting sounds or verbal commands to set the dimming level in response to detected sounds, volumes, or by interpreting the sounds, including voice recognition or, for example, by gesturing including hand or arm gesturing, etc. sonar, light, mechanical, vibration, detection and sensing, etc. Some embodiments may be dual or multiple dimming and/or control, supporting the use of multiple sources, methods, algorithms, interfaces, sensors, detectors, protocols, etc. to control and/or monitor including data logging, data mining and analytics. Some embodiments of the present invention may be multiple dimming or control (i.e., accept dimming information, input(s), control from two or more sources).

Remote interfaces include, but are not limited to, 0 to 10 V, 0 to 2 V, 0 to 1 V, 0 to 3 V, etc., RS 232, RS485, DMX, WiFi, LiFi, Bluetooth, ZigBee, IEEE 802, two wire, three wire, SPI, I2C, PLC, and others discussed in this document, etc. In various embodiments, the control signals can be received and used by the remote fluorescent lamp replacement ballast or by the LED, OLED and/or QD fluorescent lamp replacement or both. Such a Remote Controlled Florescent Ballast Replacement can also support color LED Fluorescent Lamp Replacements including single and multicolor including RGB, White plus red-green-blue (RGB) LEDs or OLEDs or other lighting sources, RGB plus one or more colors, red yellow blue (RYB), other variants, etc. Color-changing/tuning can include more than one color including RGB, WRGB, RGBW, WRGBA where A stands for amber, etc. 5 color, 6 color, N color, etc. Color-changing/tuning can include, but is not limited to, white color-tuning including the color temperature tuning/adjustments/settings/etc., color correction temperature (CCT), color rendering index (CRI), etc. Color rendering, color monitoring, color mixing, color feedback and control can be implemented using wired or wireless circuits, systems, interfaces, etc. that can be interactive using for example, but not limited to, smart phones, tablets, computers, laptops, servers, remote controls, etc. The present invention can use or, for example, make, create, produces, etc. any color of white including but not limited to soft, warm, bright, daylight, cool, etc. Color temperature monitoring, feedback, and adjustment can be performed in such embodiments of the present invention. The ability to change to different colors when using light sources capable of supporting such (i.e., LEDs, OLEDs and/or QDs including but not limited to red, green, blue, amber, white LEDs and/or any other possible combination of LEDs and colors). Some embodiments of the present invention have the ability to store color choices, selections, etc. and retrieve, restore, display, update, etc. these color choices and selections when using non-fluorescent light sources that can support color changing. Some embodiments of the present invention also have the ability to change between various color choices, selections, and associated inputs to do as well as the ability to modulate the color choices and selections.

A further feature and capability of embodiments of present invention is use of passive or active color filters and diffusers to produce enhanced lighting effects.

In addition, protection can be enabled (or disabled) by microcontroller(s), microprocessor(s), FPGAs, CLDs, PLDs, digital logic, etc. including remotely via wireless or wired connections, based on but not limited to, for example, a sequence of events and/or fault or no-fault conditions, sensor, monitoring, detection, safe operation, etc. An example of protection detection/sensing can include measuring/detecting/sensing lower current than expected due to, for example, a human person being in series with (e.g., in between) one leg of the LED, OLED and/or QD replacement fluorescent lamp and one side of the power being provided by the energized ballast. The present invention can use microcontroller(s), microprocessor(s), FPGA(s), other firmware and/or software means, digital state functions, etc. to accomplish protection, control, monitoring, operation, etc.

In addition to using a switching element, a linear regulation/regulator instead of switching regulation/regulator can be used or both linear and switching regulation or combinations of both can be used in embodiments of the present invention.

Rapid start ballasts with heater connections may be made operable using resistors and/or capacitors. Certain implementations require less power and also evenly divide and resistance or reactive (e.g., capacitive and/or inductive) impedances so as to reduce or minimize power losses for the current supplied to the fluorescent lamp replacement(s). An example when having power supplied from an instant start or other ballast without heater(s) with only one electrical connection per 'side' of the fluorescent tube/lamp or fluorescent tube replacement (for a total of two connections) the resistors are effectively put into parallel thus reducing the resistance by a factor of four compared to being in serial for, for example, a heater emulation circuit or as part of a heater emulation circuit. Such heater circuits can contain resistors, capacitors, inductors, transformers, transistors, switches, diodes, silicon-controlled rectifiers (SCR), triacs, other types of semiconductors and ICs including but not limited to op amps, comparators, timers, counters, microcontroller(s), microprocessors, DSPs, FPGAs, ASICs, CLDs, AND, NOR, Inverters and other types of Boolean logic digital components, combinations of the above, etc.

In some embodiments of the present invention, a switch may be put (at an appropriate location) in between the ballast output and the fluorescent lamp/fluorescent lamp replacement such that there is no completion of current flow in the fluorescent lamp replacement to act as a protection including shock hazard protection for humans and other living creatures in the event of an improper installation or attempt at or during installation. The detection of a such a fault or improper installation can be done by any method including analog and/or digital circuits including, but not limited to, op amps, comparators, voltage reference, current references, current sensing, voltage sensing, mechanical sensing, etc., microcontrollers, microprocessors, FPGAs, CLDs, wireless transmission, wireless sensing, optical sensing, motion sensing, light/daylight/etc. sensing, gesturing, sonar, infrared, visible light sensing, etc. A microprocessor or other alternative including, but not limited to, those discussed herein may be used to enable or disable protection and may be combined with other functions, features, controls, monitoring, etc. to improve the safety and performance of the present invention including before, during, after dimming, etc.

In embodiments of the present invention that include or involve buck, buck-boost, boost, boost-buck, etc. inductors, one or more tagalong inductors such as those disclosed in U.S. patent application Ser. No. 13/674,072, filed Nov. 11, 2012 by Sadwick et al. for a "Dimmable LED Driver with Multiple Power Sources", which is incorporated herein for all purposes, may be used and incorporated into embodiments of the present invention. Such tagalong inductors can be used, among other things and for example, to provide power and increase and enhance the efficiency of certain embodiments of the present invention. In addition, other methods including charge pumps, floating diode pumps, level shifters, pulse and other transformers, bootstrapping including bootstrap diodes, capacitors and circuits, floating gate drives, carrier drives, etc. can also be used with the present invention.

The present invention can work with programmable soft start ballasts including being able to also have a soft short at turn-on which then allows the input voltage to rise to its running and operational level can also be included in various implementations and embodiments of the present invention.

Some embodiments of the present invention utilize high frequency diodes including high frequency diode bridges and current to voltage conversion to transform the ballast output into a suitable form so as to be able to work with existing AC line input PFC-LED circuits and drivers. Some other embodiments of the present invention utilize high-frequency diodes to transform the AC output of the electronic ballast (or the low frequency AC output of a magnetic ballast into a direct current (DC) format that can be used directly or with further current or voltage regulation to power and driver LEDs for a fluorescent lamp replacement. Embodiments of the present invention can be used to convert the low frequency (i.e., typically 50 or 60 Hz) magnetic ballast AC output to an appropriate current or voltage to drive and power LEDs using either or both shunt or series regulation. Some other embodiments of the present invention combine one or more of these. In some embodiments of the present invention, one or more switches can be used to clamp the output compliance current and/or voltage of the ballast. Various implementations of the present invention can involve voltage or current forward converters and/or inverters, square-wave, sine-wave, resonant-wave, etc. that include, but are not limited to, push pull, half-bridge, full-bridge, square wave, sine wave, fly-back, resonant, synchronous, etc.

For the present invention, in general, any type of transistor or vacuum tube or other similarly functioning device can be used including, but not limited to, MOSFETs, JFETs, GANFETs, depletion or enhancement FETs, N and/or P FETs, CMOS, PNP BJTs, triodes, etc. which can be made of any suitable material and configured to function and operate to provide the performance, for example, described above. In addition, other types of devices and components can be used including, but not limited to transformers, transformers of any suitable type and form, coils, level shifters, digital logic, analog circuits, analog and digital, mixed signals, microprocessors, microcontrollers, FPGAs, CLDs, PLDs, comparators, op amps, instrumentation amplifiers, and other analog and digital components, circuits, electronics, systems etc. For all of the example figures shown, the above analog and/or digital components, circuits, electronics, systems etc. are, in general, applicable and usable in and for the present invention.

The example figure and embodiments shown in herein are merely intended to provide some illustrations of the present inventions and not limiting in any way or form for the present inventions.

Using digital and/or analog designs and/or microcontrollers and/or microprocessors any and all practical combinations of control, protection, sequencing, levels, etc., some examples of which are listed below for the present invention, can be realized.

In addition to these examples, a potentiometer or similar device such as a variable resistor may be used to control the dimming level. Such a potentiometer may be connected across a voltage such that the wiper of the potentiometer can swing from minimum voltage (i.e., full dimming) to maximum voltage (i.e., full light). Often the minimum voltage will be zero volts which may correspond to full off and, for the example embodiments shown here, the maximum will be equal to or approximately equal to the voltage on the negative input of, for example, a comparator.

Current sense methods including resistors, current transformers, current coils and windings, etc. can be used to measure and monitor the current of the present invention and provide both monitoring and protection.

In addition to dimming by adjusting, for example, a potentiometer, the present invention can also support all standards, ways, methods, approaches, techniques, etc. for interfacing, interacting with and supporting, for example, 0 to 10 V dimming with a suitable reference voltage that can be remotely set or set via an analog or digital input such as illustrated in patent application 61/652,033 filed on May 25, 2012, for a "Dimmable LED Driver", which is incorporated herein by reference for all purposes.

The present invention supports all standards and conventions for 0 to 10 V dimming or other dimming techniques. In addition the present invention can support, for example, overcurrent, overvoltage, short circuit, and over-temperature protection. The present invention can also measure and monitor electrical parameters including, but not limited to, input current, input voltage, power factor, apparent power, real power, inrush current, harmonic distortion, total harmonic distortion, power consumed, watthours (WH) or kilowatt hours (kWH), etc. of the load or loads connected to the present invention. In addition, in certain configurations and embodiments, some or all of the output electrical parameters may also be monitored and/or controlled directly for, for example, LED drivers and FL ballasts. Such output parameters can include, but are not limited to, output current, output voltage, output power, duty cycle, PWM, dimming level(s), provide data monitoring, data logging, analytics, analysis, etc. including, but not limited to, input and output current, voltage, power, phase angle, real power, light output (lumens, lux), dimming level if appropriate, kilowatt hours (kWH), efficiency, temperature including temperatures of components, driver, LED or OLED array or array or strings or other types of configurations and groupings, etc. Embodiments of the present invention can also measure the power level and peak power level and adjust the dimming to, for example, but not limited to, to avoid peak power penalty charges, etc., to respond to demand response power reductions, etc., combinations of these.

In place of the potentiometer, an encoder or decoder can be used. The use of such also permits digital signals to be used and allows digital signals to either or both locally or remotely control the dimming level and state. A potentiometer with an analog to digital converter (ADC) or converters (ADCs) could also be used in many of such implementations of the present invention.

The above examples and figures are merely meant to provide illustrations of the present and should not be construed as limiting in any way or form for the present invention.

In addition to the examples above and any combinations of the above examples, the present invention can have multiple dimming levels set by the dimmer in conjunction with the motion sensor and photosensor/photodetector and/or other control and monitoring inputs including, but not limited to, analog (e.g., 0 to 10 V, 0 to 3 V, etc.), digital (RS232, RS485, USB, DMX, SPI, SPC, UART, DALI, other serial interfaces, etc.), a combination of analog and digital, analog-to-digital converters and interfaces, digital-to-analog converters and interfaces, wired, wireless (i.e., RF, WiFi, LiFi, ZigBee, ZWave, ISM bands, 2.4 GHz, Bluetooth, etc.), powerline (PLC) including X-10, Insteon, HomePlug, etc.), etc.

The present invention is highly configurable and words such as current, set, specified, etc. when referring to, for example, the dimming level or levels, may have similar meanings and intent or may refer to different conditions, situations, etc. For example, in a simple case, the current dimming level may refer to the dimming level set by, for example, a control voltage from a digital or analog source including, but not limited to digital signals, digital to analog converters (DACs), potentiometer(s), encoders, etc.

The present invention can have embodiments and implementations that include manual, automatic, monitored, controlled operations and combinations of these operations. The present invention can have switches, knobs, variable resistors, encoders, decoders, push buttons, scrolling displays, cursors, etc. The present invention can use analog and digital circuits, a combination of analog and digital circuits, microcontrollers and/or microprocessors including, for example, DSP versions, FPGAs, CLDs, ASICs, etc. and associated components including, but not limited to, static, dynamic and/or non-volatile memory, a combination and any combinations of analog and digital, microcontrollers, microprocessors, FPGAs, CLDs, etc. Items such as the motion sensor(s), photodetector(s)/photosensor(s), microcontrollers, microprocessors, controls, displays, knobs, etc. may be internally located and integrated/incorporated into the dimmer or externally located. The switches/switching elements can consist of any type of semiconductor and/or vacuum technology including but not limited to triacs, transistors, vacuum tubes, triodes, diodes or any type and configuration, pentodes, tetrodes, thyristors, silicon-controlled rectifiers, diodes, etc. The transistors can be of any type(s) and any material(s)—examples of which are listed below and elsewhere in this document.

The dimming level(s) can be set by any method and combinations of methods including, but not limited to, motion, photodetection/light, sound, vibration, selector/push buttons, rotary switches, potentiometers, resistors, capacitive sensors, touch screens, wired, wireless, PLC interfaces, etc. In addition, both control and monitoring of some or all aspects of the dimming, motion sensing, light detection level, sound, etc. can be performed for and with the present invention.

Other embodiments can use other types of comparators and comparator configurations, other op amp configurations and circuits, including but not limited to error amplifiers, summing amplifiers, log amplifiers, integrating amplifiers, averaging amplifiers, differentiators and differentiating amplifiers, etc. and/or other digital and analog circuits, microcontrollers, microprocessors, complex logic devices (CLDs), field programmable gate arrays (FPGAs), etc.

The dimmer for dimmable drivers may use and be configured in continuous conduction mode (CCM), critical conduction mode (CRM), discontinuous conduction mode (DCM), resonant conduction modes, etc., with any type of circuit topology including but not limited to buck, boost, buck-boost, boost-buck, Cuk, SEPIC, flyback, forward-converters, etc. The present invention works with both isolated and non-isolated designs including, but not limited to, buck, boost-buck, buck-boost, boost, Cuk, SEPIC, flyback and forward-converters including but not limited to push-pull, single and double forward converters, current mode, voltage mode, current fed, voltage fed, etc. The present invention itself may also be non-isolated or isolated, for example using a tagalong inductor or transformer winding or other isolating techniques, including, but not limited to, transformers including signal, gate, isolation, etc. transformers, optoisolators, optocouplers, etc.

The present invention may include other implementations that contain various other control circuits including, but not limited to, linear, square, square-root, power-law, sine, cosine, other trigonometric functions, logarithmic, exponential, cubic, cube root, hyperbolic, etc. in addition to error, difference, summing, integrating, differentiators, etc. type of op amps. In addition, logic, including digital and Boolean logic such as AND, NOT (inverter), OR, Exclusive OR gates, etc., complex logic devices (CLDs), field programmable gate arrays (FPGAs), microcontrollers, microprocessors, application specific integrated circuits (ASICs), etc. can also be used either alone or in combinations including analog and digital combinations for the present invention. The present invention can be incorporated into an integrated circuit, be an integrated circuit, etc. It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

Embodiments of the present invention may also include short circuit protection (SCP) and other forms of protection including protection against damage due to other sources of power including but not limited to AC mains power lines and/or other types of devices, circuits, etc. Some embodiments of the present invention may use, for example, but are not limited to capacitors to limit the low frequency (examples include, but are not limited to, AC line mains at 50 Hz, 60 Hz, 400 Hz) voltage and/or current that can be applied to the load. In addition to capacitors, inductors and resistors may also be used in some embodiments of the present invention.

The present invention can also incorporate at an appropriate location or locations one or more thermistors (i.e., either of a negative temperature coefficient [NTC] or a positive temperature coefficient [PTC]) to provide temperature-based load current limiting.

As an example, when the temperature rises at the selected monitoring point(s), the phase dimming of the present invention can be designed and implemented to drop, for example, by a factor of, for example, two. The output power, no matter where the circuit was originally in the dimming cycle, will also drop/decrease by some factor. Values other than a factor of two (i.e., 50%) can also be used and are easily implemented in the present invention by, for example, changing components of the example circuits described here for the present invention. As an example, a resistor change would allow and result in a different phase/power decrease than a factor of two. The present invention can be made to have a rather instant more digital-like decrease in output power or a more gradual analog-like decrease, including, for example, a linear decrease in output phase or power once, for example, the temperature or other stimulus/signal(s) trigger/activate this thermal or other signal control.

In other embodiments, other temperature sensors may be used or connected to the circuit in other locations. The present invention also supports external dimming by, for example, an external analog and/or digital signal input. One or more of the embodiments discussed above may be used in practice either combined or separately including having and supporting both 0 to 10 V and digital dimming. The present invention can also have very high power factor. The present invention can also be used to support dimming of a number of circuits, drivers, etc. including in parallel configurations. For example, more than one driver can be put together, grouped together with the present invention. Groupings can be done such that, for example, half of the dimmers are forward dimmers and half of the dimmers are reverse dimmers. Again, the present invention allows easy selection between forward and reverse dimming that can be performed manually, automatically, dynamically, algorithmically, can employ smart and intelligent dimming decisions, artificial intelligence, remote control, remote dimming, etc.

The present invention may be used in conjunction with dimming to provide thermal control or other types of control to, for example, a dimming LED driver. For example, embodiments of the present invention or variations thereof may also be adapted to provide overvoltage or overcurrent protection, short circuit protection for, for example, a dimming LED or OLED driver, etc., or to override and cut the phase and power to the dimming LED driver(s) based on any arbitrary external signal(s) and/or stimulus. The present invention can also be used for purposes and applications other than lighting—as an example, electrical heating where a heating element or elements are electrically controlled to, for example, maintain the temperature at a location at a certain value. The present invention can also include circuit breakers including solid state circuit breakers and other devices, circuits, systems, etc. that limit or trip in the event of an overload condition/situation. The present invention can also include, for example analog or digital controls including but not limited to wired (i.e., 0 to 10 V, RS 232, RS485, IEEE standards, SPI, I2C, other serial and parallel standards and interfaces, etc.), wireless including as discussed above, powerline, etc. and can be implemented in any part of the circuit for the present invention. The present invention can be used with a buck, a buck-boost, a boost-buck and/or a boost, flyback, or forward-converter design, topology, implementation, others discussed herein, etc.

A dimming voltage signal, VDIM, which represents a voltage from, for example but not limited to, a 0-10 V Dimmer can be used with the present invention; when such a VDIM signal is connected, the output as a function time or phase angle (or phase cut) will correspond to the inputted VDIM.

Other embodiments can use comparators, other op amp configurations and circuits, including but not limited to error amplifiers, summing amplifiers, log amplifiers, integrating amplifiers, averaging amplifiers, differentiators and differentiating amplifiers, etc. and/or other digital and analog circuits, microcontrollers, microprocessors, complex logic devices, field programmable gate arrays, etc.

Some embodiments include a circuit that dynamically adjusts such that the output current to a load such as a LED and/or OLED array is essentially kept constant by, for example, in some embodiments of the present invention shorting or shunting current from the ballast as needed to maintain the output current to a load such as a LED array essentially constant. Some embodiments of the present invention may use time constants to as part of the circuit.

Some embodiments include a circuit to power a protection device/switch such that the switch is on unless commanded or controlled to be set off in the event/situation/condition of a fault hazard. Such a control can be implemented in various and diverse forms and types including, but not limited to, latching, hiccup mode, etc. In some embodiments of the present invention such a circuit may have a separate rectification stage. In and for various embodiments of the present invention, the device/switch may be of any type or form or function and includes but is not limited to, semiconductor switches, vacuum tube switches, mechanical switches, relays, etc.

Some embodiments include an over-voltage protection (OVP) circuit that shunts/shorts or limits the ballast output and/or the output to the load such as a LED array in the event that the output voltage exceeds a set value.

Some embodiments include an over temperature protection (OTP) circuit that shunts/shorts or limits the ballast output and/or the output to the load such as a LED array in the event that the temperature at one or more locations exceeds a set value or set values.

Embodiments of the present invention may also include short circuit protection (SCP) and other forms of protection including protection against damage due to other sources of power including but not limited to AC mains power lines and/or other types of devices, circuits, etc. Some embodiments of the present invention may use, for example, but are not limited to capacitors to limit the low frequency (examples include, but are not limited to, AC line mains at 50 Hz, 60 Hz, 400 Hz) voltage and/or current that can be applied to the load.

Embodiments of the present invention include, but are not limited to, having a rectification stage (such as, but not limited to) consisting of a single full wave rectification stage to provide power/current to the output load such as an LED output load and a rectification stage (such as, but not limited to) consisting of a single full wave rectification stage to provide power to, for example, the hazard protection circuit.

Remote dimming can be performed using a controller implementing motion detection, recognizing motion or proximity to a detector or sensor and setting a dimming level in response to the detected motion or proximity, or with audio detection, for example detecting sounds or verbal commands to set the dimming level in response to detected sounds, volumes, or by interpreting the sounds, including voice recognition or, for example, by gesturing including hand or arm gesturing, etc. Some embodiments may be dual dimming, supporting the use of a 0-10 V dimming signal in addition to a Triac-based or other phase-cut or phase angle dimmer. Some embodiments of the present invention may multiple dimming (i.e., accept dimming information, input(s), control from two or more sources). In addition, the resulting dimming, including current or voltage dimming, can be either PWM (digital) or analog dimming or both or selectable either manually, automatically, or by other methods and ways including software, remote control of any type including, but not limited to, wired, wireless, voice, voice recognition, gesturing including hand and/or arm gesturing, pattern and motion recognition, PLC, RS232, RS422, RS485, SPI, I2C, universal serial bus (USB), Firewire 1394, DALI, DMX, etc. Voice, voice recognition, gesturing, motion, motion recognition, etc. can also be transmitted via wireless, wired and/or powerline communications or other methods, etc. In some embodiments of the present invention speakers, earphones, microphones, etc. may be used with voice, voice recognition, sound, etc. and other methods, ways, approaches, algorithms, etc. discussed herein.

The present invention includes implementations that contain various other control circuits including, but not limited to, linear, square, square-root, power-law, sine, cosine, other trigonometric functions, logarithmic, exponential, cubic, cube root, hyperbolic, etc. in addition to error, difference, summing, integrating, differentiators, etc. type of op amps. In addition, logic, including digital and Boolean logic such as AND, NOT (inverter), OR, Exclusive OR gates, etc., complex logic devices (CLDs), field programmable gate arrays (FPGAs), microcontrollers, microprocessors, application specific integrated circuits (ASICs), etc. can also be used either alone or in combinations including analog and digital combinations for the present invention. The present invention can be incorporated into an integrated circuit, be an integrated circuit, etc.

The present invention, although described primarily for motion and light/photodetection control, can and may also use other types of stimuli, input, detection, feedback, response, etc. including but not limited to sound, vibration, frequencies above and below the typical human hearing range, temperature, humidity, pressure, light including below the visible (i.e., infrared, IR) and above the visible (i.e., ultraviolet, UV), radio frequency signals, combinations of these, etc. For example, the motion sensor may be replaced or augmented with a sound sensor (including broad, narrow, notch, tuned, tank, etc. frequency response sound sensors) and the light sensor could consist of one or more of the following: visible, IR, UV, etc. sensors. In addition, the light sensor(s)/detector(s) can also be replaced or augmented by thermal detector(s)/sensor(s), etc.

The example embodiments disclosed herein illustrate certain features of the present invention and not limiting in any way, form or function of present invention. The present invention is, likewise, not limited in materials choices including semiconductor materials such as, but not limited to, silicon (Si), silicon carbide (SiC), silicon on insulator (SOI), other silicon combination and alloys such as silicon germanium (SiGe), etc., diamond, graphene, gallium nitride (GaN) and GaN-based materials, gallium arsenide (GaAs) and GaAs-based materials, etc. The present invention can include any type of switching elements including, but not limited to, field effect transistors (FETs) of any type such as metal oxide semiconductor field effect transistors (MOSFETs) including either p-channel or n-channel MOSFETs of any type, junction field effect transistors (JFETs) of any type, metal emitter semiconductor field effect transistors, etc. again, either p-channel or n-channel or both, bipolar junction transistors (BJTs) again, either NPN or PNP or both, heterojunction bipolar transistors (HBTs) of any type, high electron mobility transistors (HEMTs) of any type, unijunction transistors of any type, modulation doped field effect transistors (MODFETs) of any type, etc., again, in general, n-channel or p-channel or both, vacuum tubes including diodes, triodes, tetrodes, pentodes, etc. and any other type of switch, etc.

The examples shown above are intended to provide non-limiting examples of the present invention and represent only a very small sampling of the possible ways, topologies, connections, arrangements, applications, etc. of the present invention. Based upon the disclosure provided herein, one of skill of the art will recognize a number of combinations and applications of solid-state lighting system elements disclosed herein that can be used in accordance with various embodiments of the invention without departing from the inventive concepts.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some cases, parts of a given system, block or circuit may be implemented in software or firmware, while other parts are implemented in hardware.

In some embodiments of the present invention, in addition to AC dimming by potentiometer, rheostat, transformer, variable resistor, Variac, variable AC voltage, etc., one or more of wired, PLC, wireless communications for example, but not limited to, control, monitoring, logging, maintenance including remote and local, etc.

In some embodiments of the present invention, the top and bottom LED arrays a fluorescent tube replacement or other tube or multi-sided LED assembly can also function as a spare when either the top or bottom LED array(s) decrease/degrade in intensity, fail, etc., can be rotated 180 degrees in the top and bottom 'direction' and function effectively and essentially as a 'new' lamp.

In some embodiments of the present invention the fluorescent tubes can be replaced or used in addition to the SSL/LED fluorescent tube replacements with SSL including but not limited to LEDs in strip(s), panel(s), board(s), string(s), etc. form, form factor, etc. that can be attached/connected to the fixture. In some embodiments of the present invention the fluorescent tubes can be replaced or used in addition to the SSL/LED fluorescent tube replacements with SSL including but not limited to LEDs in strip(s), panel(s), board(s), string(s), etc. form, form factor, etc. that can be attached/connected to the fixture including, but not limited to, with or without a housing, enclosure, etc. and, for example, but not limited to, directly to the fixture, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components. For example, op amp and comparator in most cases may be used in place of one another in this document.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A solid state lighting assembly comprising:

a housing;

a pair of electrical connections on the housing;

a substrate within the housing and dividing the housing into at least two sections;

at least one solid state light mounted to the substrate in one of the at least two sections and electrically connected to the pair of electrical connections; and at least one solid state installation error indicator light mounted to the substrate in another of the at least two sections and electrically connected to the pair of electrical connections in an opposite polarity from the connection of the at least one solid state light to the pair of electrical connections.

2. The solid state lighting assembly of claim 1, wherein the at least one solid-state light comprises a fluorescent lamp replacement.

3. The solid state lighting assembly of claim 1, wherein the housing has a fluorescent lamp form factor.

4. The solid state lighting assembly of claim 1, further comprising an LED driver connected between the pair of electrical connections and the at least one solid state light and at least one solid state installation error indicator light.

5. The solid state lighting assembly of claim 4, wherein the LED driver is configured to receive AC power with a frequency of about 400 Hz.

6. The solid state lighting assembly of claim 4, wherein the LED driver comprises a dimming signal input and wherein the LED driver is adapted to control an output current to the at least one solid state light based at least in part on a dimming signal received on the dimming signal input.

7. The solid state lighting assembly of claim 6, wherein the dimming signal comprises an AC dimming signal.

8. The solid state lighting assembly of claim 7, wherein the AC dimming signal has a frequency of about 400 Hz.

9. The solid state lighting assembly of claim 7, wherein the LED driver is configured control dimming based at least in part on an amplitude of a voltage of the AC dimming signal.

10. The solid state lighting assembly of claim 4, further comprising a driver connector configured to electrically connect the LED driver to the pair of electrical connections, whereby an electrical connection to the pair of electrical connections can be modified.

11. The solid state lighting assembly of claim 10, wherein the driver connector is configured to enable modification of the electrical connection to the pair of electrical connections by jumpers.

12. The solid state lighting assembly of claim 10, wherein the driver connector is configured to enable connection of the solid state lighting assembly to a second instance of a solid state lighting assembly, and wherein the driver connector can be configured for both parallel and series connection between the solid state lighting assembly and the second instance of the solid state lighting assembly.

13. The solid state lighting assembly of claim 10, wherein the housing is adapted to physically connect to a pair of tombstone connectors, and wherein the driver connector is configured to electrically connect the pair of electrical connections to each of the pair of tombstone connectors.

14. The solid state lighting assembly of claim 10, wherein the housing is adapted to physically connect to a pair of tombstone connectors, and wherein the driver connector is configured to electrically connect the pair of electrical connections to only one of the pair of tombstone connectors.

* * * * *